United States Patent
Takahashi et al.

(10) Patent No.: US 8,465,395 B2
(45) Date of Patent: Jun. 18, 2013

(54) CONTROL APPARATUS AND METHOD FOR AUTOMATIC TRANSMISSION

(75) Inventors: Seiichiro Takahashi, Isehara (JP); Tatsuo Ochiai, Kanagawa (JP); Masaaki Uchida, Yokosuka (JP); Masato Koga, Hiratsuka (JP); Ryoji Kadono, Kawasaki (JP); Tateki Jozaki, Yokohama (JP); Hideaki Suzuki, Yokohama (JP); Ryousuke Nonomura, Kawasaki (JP); Mamiko Inoue, Machida (JP)

(73) Assignees: Nissan Motor Co., Ltd., Yokohama-shi (JP); JATCO Ltd, Fuji-shi (JP)

( * ) Notice: Subject to any disclaimer, the term of this patent is extended or adjusted under 35 U.S.C. 154(b) by 569 days.

(21) Appl. No.: 12/712,448

(22) Filed: Feb. 25, 2010

(65) Prior Publication Data

US 2010/0227736 A1 Sep. 9, 2010

(30) Foreign Application Priority Data

Mar. 6, 2009 (JP) .................................. 2009-054026

(51) Int. Cl.
*B60W 10/04* (2006.01)
*F16H 59/30* (2006.01)

(52) U.S. Cl.
USPC .............................. 477/115; 477/41; 477/121

(58) Field of Classification Search
USPC ................... 477/115, 118, 120, 121, 143, 41, 477/44; 475/208, 209
See application file for complete search history.

(56) References Cited

U.S. PATENT DOCUMENTS

| 4,653,351 | A | 3/1987 | Downs et al. |
| 4,672,863 | A | 6/1987 | Itoh et al. |
| 6,182,000 | B1 | 1/2001 | Ohta et al. |
| 6,377,882 | B1 | 4/2002 | Ito |
| 6,855,085 | B1 | 2/2005 | Gumpoltsberger |
| 7,384,375 | B2 * | 6/2008 | Yamada et al. ............... 477/143 |
| 7,563,196 | B2 | 7/2009 | Yamada et al. |
| 7,563,197 | B2 * | 7/2009 | Ayabe et al. .................. 477/121 |

(Continued)

FOREIGN PATENT DOCUMENTS

| EP | 0 410 451 A2 | 1/1991 |
| EP | 806 592 A2 | 11/1997 |

(Continued)

OTHER PUBLICATIONS

U.S. Appl. No. 12/712,429, filed Feb. 25, 2010, Takahashi et al.

(Continued)

*Primary Examiner* — Roger Pang
(74) *Attorney, Agent, or Firm* — Foley & Lardner LLP

(57) ABSTRACT

A control apparatus for an automatic transmission includes a stepwise variable transmission mechanism; a power ON/OFF state judging section; and a shift control section configured to control the stepwise variable transmission mechanism to a target rotational speed by disengaging the first engagement portion and engaging the second engagement portion in accordance with a torque inputted to the stepwise variable transmission mechanism, the shift control section being configured to engage one of the first engagement portion and the second engagement portion which has a function to suppress a variation of an input rotational speed of the stepwise variable transmission mechanism which is generated by a switching of the power ON/OFF state when the power ON/OFF state is switched at the shift control of the stepwise variable transmission mechanism, and to disengage the other of the first engagement portion and the second engagement portion.

7 Claims, 19 Drawing Sheets

U.S. PATENT DOCUMENTS

| | | | |
|---|---|---|---|
| 7,771,316 B2 | 8/2010 | Honma et al. | |
| 7,822,524 B2 | 10/2010 | Tabata et al. | |
| 2001/0044683 A1 | 11/2001 | Takaoka et al. | |
| 2002/0035013 A1* | 3/2002 | Saito | 477/120 |
| 2005/0272555 A1 | 12/2005 | Tabata et al. | |
| 2006/0154780 A1 | 7/2006 | Ayabe et al. | |
| 2007/0093358 A1 | 4/2007 | Ayabe et al. | |

FOREIGN PATENT DOCUMENTS

| | | |
|---|---|---|
| EP | 0 959 270 A2 | 11/1999 |
| JP | 61-105361 A | 5/1986 |
| JP | 5-079554 A | 3/1993 |
| JP | 5-240335 A | 9/1993 |
| JP | 6-129528 A | 5/1994 |
| JP | 8-285064 A | 11/1996 |
| JP | 8-291858 A | 11/1996 |
| JP | 10-331962 A | 12/1998 |
| JP | 10-331963 A | 12/1998 |
| JP | 11-37267 A | 2/1999 |
| JP | 11-141675 A | 5/1999 |
| JP | 11-182663 A | 7/1999 |
| JP | 2000-205398 A | 7/2000 |
| JP | 2003-42284 A | 2/2003 |
| JP | 2003-314681 A | 11/2003 |
| JP | 2004-316811 A | 11/2004 |
| JP | 2006-348985 A | 12/2006 |
| JP | 2007-92665 A | 4/2007 |
| JP | 2007-225048 A | 9/2007 |
| JP | 2007-263206 A | 10/2007 |

OTHER PUBLICATIONS

U.S. Appl. No. 12/712,437, filed Feb. 25, 2010, Takahashi et al.
U.S. Appl. No. 12/712,440, filed Feb. 25, 2010, Takahashi et al.
U.S. Appl. No. 12/712,454, filed Feb. 25, 2010, Takahashi et al.
S. Takahashi et al., US PTO Notice of Allowance, U.S. Appl. No. 12/712,440, dated May 9, 2012, (8 pgs.).
Takahashi et al., USPTO Non-Final Office Action, U.S. Appl. No. 12/712,440, Nov. 3, 2011, 18 pgs.
S. Takahashi et al., US Non-Final Office Action, U.S. Appl. No. 12/712,437, dated Aug. 16, 2012, (13 pgs.).
Chinese Office Action dated Jul. 4, 2012, (12 pgs.).
S. Takahashi et al., US Notice of Allowance on U.S. Appl. No. 12/712,454 DTD Sep. 27, 2012, 13 pgs.
S. Takahashi et al., US Notice of Allowance, U.S. Appl. No. 12/712,429, dated Nov. 23, 2012, (48 pgs.) (with 21 US references).
S. Takahashi et al., US Notice of Allowance, U.S. Appl. No. 12/712,437, dated Dec. 7, 2012, (7 pgs.).

* cited by examiner

[DURING NO SHIFT, DURING SHIFT PREPARATION PHASE]

[DURING SHIFT (TORQUE PHASE, INERTIA PHASE)]

US 8,465,395 B2

CONTROL APPARATUS AND METHOD FOR AUTOMATIC TRANSMISSION

BACKGROUND OF THE INVENTION

This invention relates to a control apparatus and method for an automatic transmission configured to attain a target transmission ratio even when a power ON/OFF state is switched during a changeover shift that a shift is performed by disengaging a first engagement portion and engaging a second engagement portion.

A Japanese Patent Application Publication No. 2007-263206 discloses a conventional control apparatus for an automatic transmission including a clutch (engagement portion) on an engagement side and a clutch (engagement portion) on a disengagement side which perform a changeover shift. In this control apparatus, the clutch on the engagement side is positively controlled in response to a power ON downshift command so as to prevent the surge (sudden increase) of an engine and shift shock.

SUMMARY OF THE INVENTION

However, when the power ON/OFF state is switched during the changeover shift, the transmission ratio may be varied by the switching of the power ON/OFF state. That is, in the conventional control apparatus, when the power ON/OFF state is switched during the changeover shift, the transmission ratio of the stepwise variable transmission mechanism may vary to a value different from the target transmission ratio. Consequently, in the conventional control apparatus, when the power ON/OFF state is switched during the changeover shift, the shift shock may be generated.

It is, therefore, an object of the present invention to provide a control apparatus and method for an automatic transmission to be devised to solve the above-mentioned problem, and to attain a target transmission ratio even when a power ON/OFF state is switched during a changeover shift.

According to one aspect of the present invention, a control apparatus for an automatic transmission, the control apparatus comprises: a stepwise variable transmission mechanism including a plurality of engagement portions having a first engagement portion and a second engagement portion, the stepwise variable transmission mechanism being arranged to attain a target shift stage by combining a disengagement or an engagement of each of the engagement portions; a power ON/OFF state judging section configured to judge a power ON/OFF state; and a shift control section configured to control the stepwise variable transmission mechanism to a target rotational speed by disengaging the first engagement portion and engaging the second engagement portion in accordance with a torque inputted to the stepwise variable transmission mechanism, the shift control section being configured to engage one of the first engagement portion and the second engagement portion which has a function to suppress a variation of an input rotational speed of the stepwise variable transmission mechanism which is generated by a switching of the power ON/OFF state when the power ON/OFF state is switched at the shift control of the stepwise variable transmission mechanism, and to disengage the other of the first engagement portion and the second engagement portion.

According to another aspect of the invention, a control method for an automatic transmission, the control apparatus including a stepwise variable transmission mechanism including a plurality of engagement portions having a first engagement portion and a second engagement portion, the stepwise variable transmission mechanism being arranged to attain a target shift stage by combining a disengagement or an engagement of each of the engagement portions, the control method comprises: judging a power ON/OFF state; controlling the stepwise variable transmission mechanism to a target rotational speed by disengaging the first engagement portion and engaging the second engagement portion in accordance with a torque inputted to the stepwise variable transmission mechanism; engaging one of the first engagement portion and the second engagement portion which has a function to suppress a variation of an input rotational speed of the stepwise variable transmission mechanism which is generated by a switching of the power ON/OFF state when the power ON/OFF state is switched at the shift control of the stepwise variable transmission mechanism; and disengaging the other of the first engagement portion and the second engagement portion.

DETAILED DESCRIPTION OF THE INVENTION

Hereinafter, a control apparatus for an automatic transmission according to an embodiment of the present invention is illustrated in detail with reference to drawings.

Figure 1:
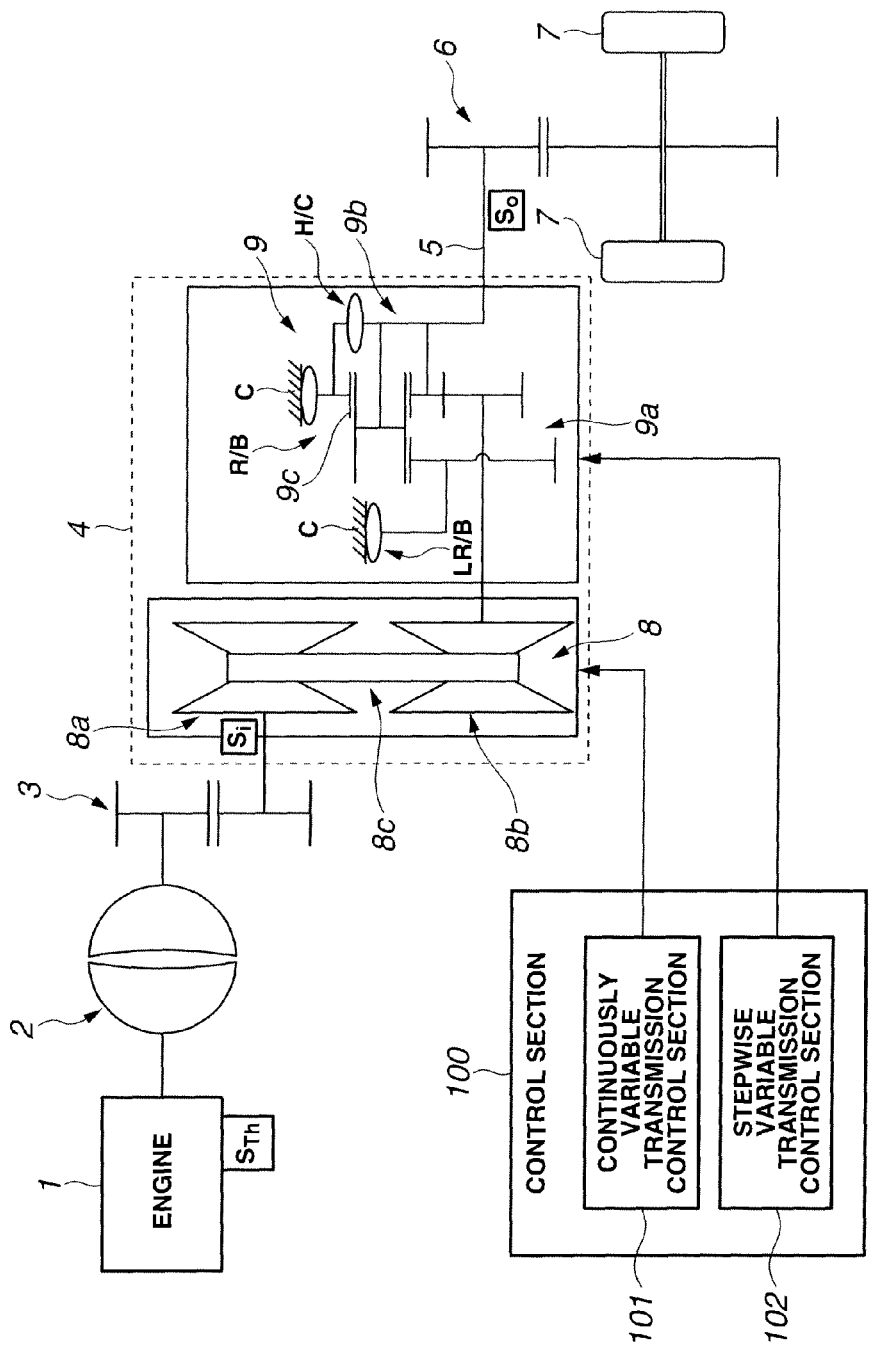
FIG. 1 is a diagrammatic view showing a power train equipped with a control apparatus for an automatic transmission according to an embodiment of the present invention.

FIG. 1 is a diagrammatic view showing a power train equipped with a control apparatus for an automatic transmission according to the embodiment of the present invention. The power train includes an engine 1 which is a driving source; a torque converter 2 drivingly connected with engine 1; a reduction mechanism 3, an automatic transmission 4 which is drivingly connected through reduction mechanism 3 to torque converter 2, and which has a transmission output shaft (propeller shaft) 5; a final drive gear mechanism 6 drivingly connected through transmission output shaft 5 to automatic transmission 4; and wheels 7 to which a power from automatic transmission 4 is outputted through final drive gear mechanism 6.

Automatic transmission 4 includes a continuously variable transmission mechanism 8 and an auxiliary transmission mechanism 9.

Continuously variable transmission mechanism 8 is a well-known belt-type continuously variable transmission mechanism including a driving pulley 8a connected to an output shaft of reduction mechanism 3, a driven pulley 8b connected to an input shaft of auxiliary transmission mechanism 9, and a belt 8c wound around driving pulley 8a and driven pulley 8b. Driving pulley 8a and driven pulley 8b are supplied, respectively, with a hydraulic fluid, and arranged to vary pulley widths in accordance with hydraulic pressures of the hydraulic fluid. With this, continuously variable transmission mechanism 8 makes it possible to vary a transmission ratio or transmission gear ratio in a stepless manner by controlling the supply pressure to driving pulley 8a and the supply pressure to driven pulley 8b.

Auxiliary transmission mechanism 9 is a stepwise variable transmission mechanism or step geared transmission mechanism including a compound sun gear 9a, a carrier 9b, and a ring gear 9c of Ravigneaux type planetary gear train mechanism. Sun gear 9a is drivingly connected to driven pulley 8b. Sun gear 9a serves as an input. Carrier 9b is drivingly connected to transmission output shaft 5. Carrier 9b serves as an output. Sun gear 9a is fixed through a low and reverse brake (first speed selection brake) LR/B to a case C. Carrier 9b is drivingly connected through a high clutch (second speed selection clutch) H/C to ring gear 9c. Moreover, ring gear 9c is fixed through a reverse brake R/B to case C.

Low and reverse brake (hereinafter, referred to as a low brake) LR/B, high clutch H/C and reverse brake R/B are supplied with the hydraulic fluid, and arranged to freely engage or disengage in accordance with the hydraulic pressures of the hydraulic fluid. With this, auxiliary transmission mechanism 9 makes it possible to select a first forward speed, a second forward speed and a reverse speed by controlling the supply pressures to low brake LR/B, high clutch H/C and reverse brake R/B.

In case of selecting the first forward speed, low brake LR/B is engaged, and high clutch H/C is disengaged. In case of selecting the second forward speed, low brake LR/B is disengaged, and high clutch H/C is engaged. A relationship between the engagements and the disengagements in the control of auxiliary transmission mechanism 9 is represented as follows.

|  | LR/B | H/C | R/B |
| --- | --- | --- | --- |
| First Speed | ○ | X | X |
| Second Speed | X | ○ | X |
| Reverse | ○ | X | ○ |

As shown in FIG. 1, the vehicle of this example includes a shift control section 100 configured to control the shift of automatic transmission 4. Shift control section 100 includes a continuously variable transmission control section 101 configured to calculate a target input rotational speed $N_t(0)$ of automatic transmission 4, and to control the transmission ratio (hereinafter, a continuously variable transmission side ratio) $Ra_{(CVT)}$ of continuously variable transmission mechanism 8 in a stepless manner, based on target input rotational speed $N_t(0)$, and a stepwise variable transmission control section 102 configured to calculate a target shift stage or target shift range of auxiliary transmission mechanism 9, and to control stepwise variable transmission mechanism 9 to this target shift stage.

That is, the shift control of continuously variable transmission mechanism 8 and the shift control of auxiliary transmission mechanism 9 are cooperated or coordinated, so that automatic transmission 4 attains target transmission ratio $I_O$.

Figure 2:
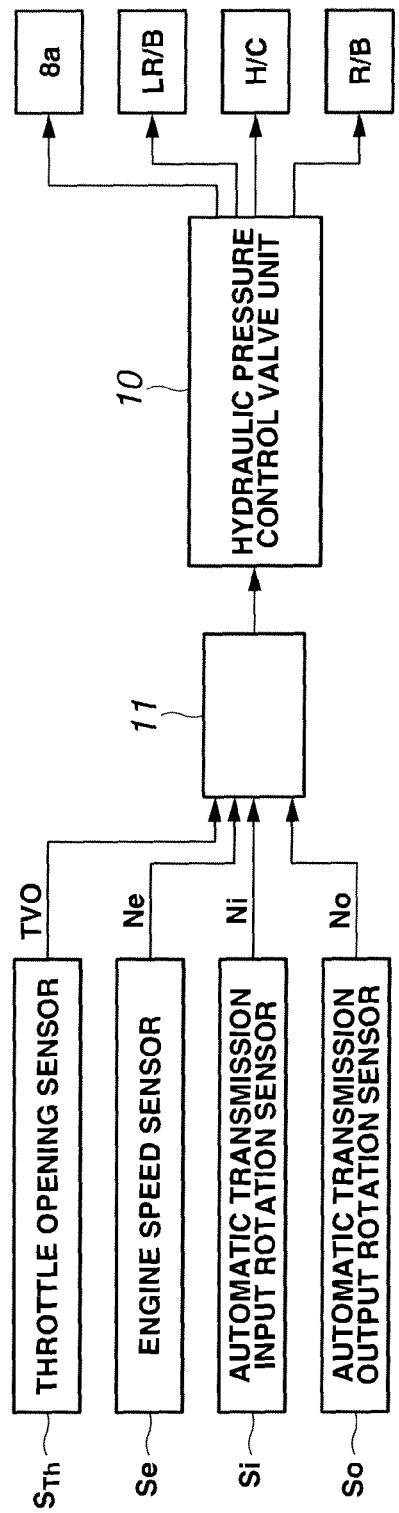
FIG. 2 is a diagrammatic view showing a control system of the power train of FIG. 1.

In continuously variable transmission mechanism 8, the hydraulic pressures supplied to driving pulley 8a and driven pulley 8b (normally, only a hydraulic pressure supplied to driving pulley 8a) are controlled by controlling ON/OFF states of a plurality of solenoid valves equipped in a hydraulic control valve unit 10, as shown in FIG. 2. With this, the transmission ratio can be varied in the stepless manner. Similarly, in auxiliary transmission mechanism 9, the hydraulic pressures supplied to low brake LR/B, high clutch H/C and reverse brake R/B are controlled by controlling ON/OFF states of a plurality of solenoid valves equipped in hydraulic control valve unit 10. With this, the first forward speed or the second forward speed is selected.

As shown in FIG. 2, hydraulic control valve unit 10 is controlled by a transmission controller 11. Transmission controller 11 receives a signal from a throttle opening sensor $S_{Th}$ arranged to sense a throttle opening TVO, a signal from an engine speed sensor $S_e$ arranged to sense an output rotational speed (hereinafter, referred to as engine speed) $N_e$ of engine 1, a signal from an automatic transmission input rotation sensor $S_i$ arranged to sense an input rotational speed (hereinafter, automatic transmission input rotational speed) $N_i$ of automatic transmission 4, a signal from an automatic transmission output rotation sensor $S_o$ arranged to sense a rotational speed (hereinafter, referred to as automatic transmission output rotational speed) $N_o$ of transmission output shaft 5 and so on.

Figure 3:
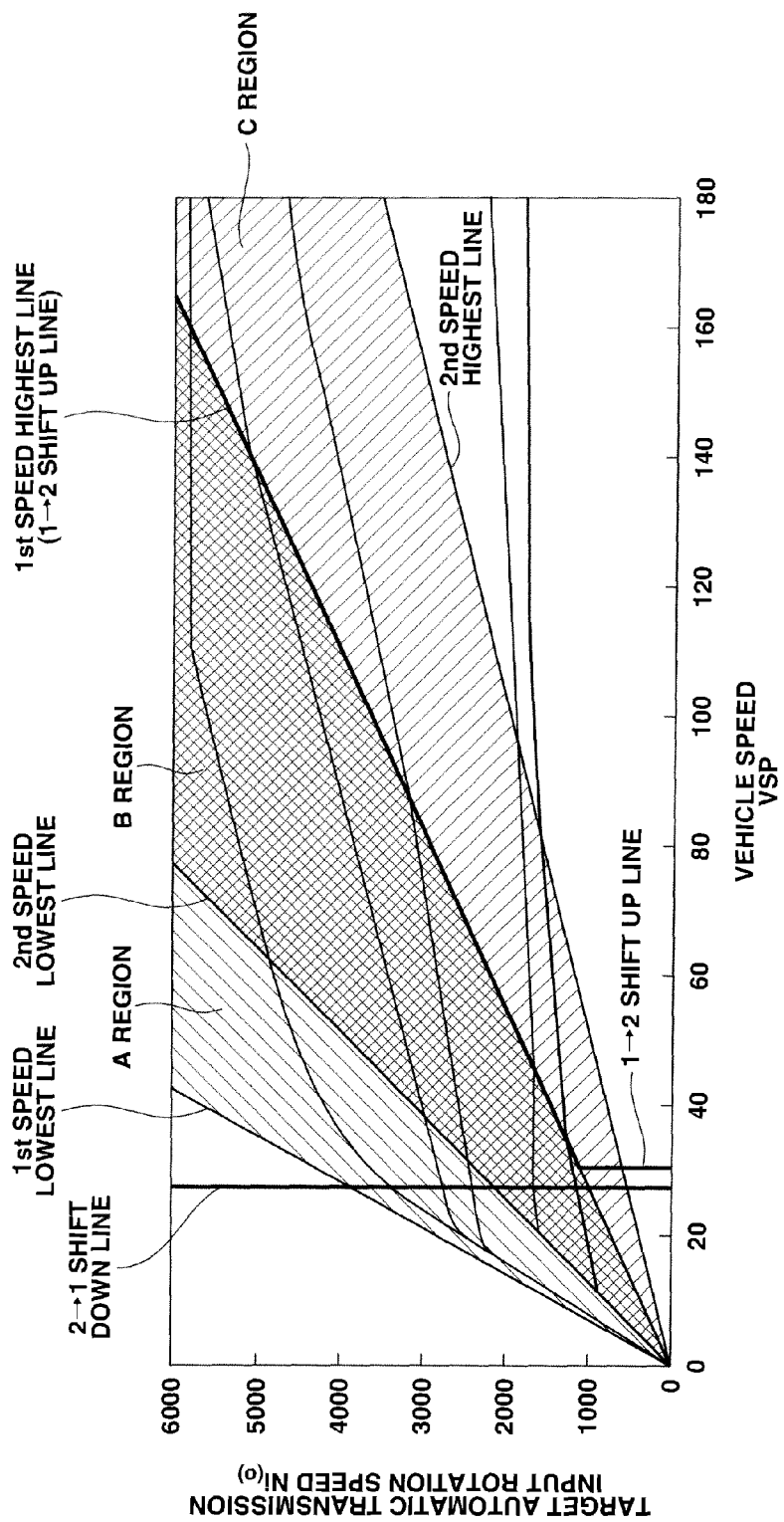
FIG. 3 is a shift diagram showing a shift line used at a shift control of the control apparatus of FIG. 1.

Transmission controller 11 performs a shift control of automatic transmission 4 as follows, based on these input information by using a shift diagram exemplified in FIG. 3. The shift diagram of FIG. 3 is formed by combining a shift line of continuously variable transmission mechanism 8 and a shift line of auxiliary transmission mechanism 9. When the first forward speed is selected as the shift stage of auxiliary transmission mechanism 9, continuously variable transmission mechanism 8 can shift between a first speed (1st) lowest line and a first speed (1st) highest line. When the second forward speed is selected as the shift stage of auxiliary transmission mechanism 9, continuously variable transmission mechanism 8 can shift between a second speed (2nd) lowest line and a second speed (2nd) highest line.

Therefore, the shift control can be performed in a region A of FIG. 3 only when the shift stage of auxiliary transmission mechanism 9 is the first forward speed. The shift control can be performed in a region B of FIG. 3 when the shift stage of auxiliary transmission mechanism 9 is the first forward speed and also the second forward speed. Moreover, the shift control can be performed in a region C of FIG. 3 only when the shift stage of auxiliary transmission mechanism 9 is the second forward speed.

In region A-C, target automatic transmission input rotational speed $N_i(0)$ is determined in accordance with vehicle speed VSP and throttle opening TVO based on the shift diagram of FIG. 3, like the conventional control operation. Continuously variable transmission mechanism 8 is controlled to attain this target automatic transmission input rotational speed $N_i(0)$. With this, in continuously variable transmission mechanism 8, the transmission ratio can be continuously controlled in the stepless manner. That is, hydraulic control valve unit 10 and transmission controller 11 correspond to continuously variable transmission control section 101.

On the other hand, in a shift line of auxiliary transmission mechanism 9, a first forward speed region and a second forward speed region are determined by a 1→2 shift UP line at which the shift stage is switched from the first forward speed to the second forward speed, and a 2→1 shift Down line at which the shift stage is switched from the second forward speed to the first forward speed.

For example, when a running state determined by vehicle speed VSP and throttle opening TVO is a running state to move across the 1→2 shift UP line from the low vehicle speed side to the high vehicle speed side, low brake LR/B is disengaged, and high clutch H/C is engaged, so that auxiliary transmission mechanism 9 attains (selects) the second forward speed.

On the other hand, when a running state determined by vehicle speed VSP and throttle opening TVO is a running state to move across the 2→1 shift Down line from the high vehicle speed side to the low vehicle speed side, high clutch H/C is disengaged, and low brake LR/B is engaged, so that auxiliary transmission mechanism 9 attains (selects) the first forward speed. That is, hydraulic control valve unit 10 and transmission controller 11 correspond to stepwise variable transmission control section 102.

Accordingly, in auxiliary transmission mechanism 9, the first forward speed or the second forward speed is selected in accordance with the calculated vehicle speed VSP and the calculated throttle opening TVO by using the shift diagram of FIG. 3. At the same time, in continuously variable transmission mechanism 8, the shift control is performed in the stepless manner in accordance with vehicle speed VSP and throttle opening TVO.

Moreover, automatic transmission 4 performs the shift of continuously variable transmission mechanism 8 in the stepless manner at the same time of a changeover shift (replacement gearshift) of auxiliary transmission mechanism 9. The shift control operation of continuously variable transmission mechanism 8 cooperates (coordinates) with the shift control operation of auxiliary transmission mechanism 9.

Figure 4:
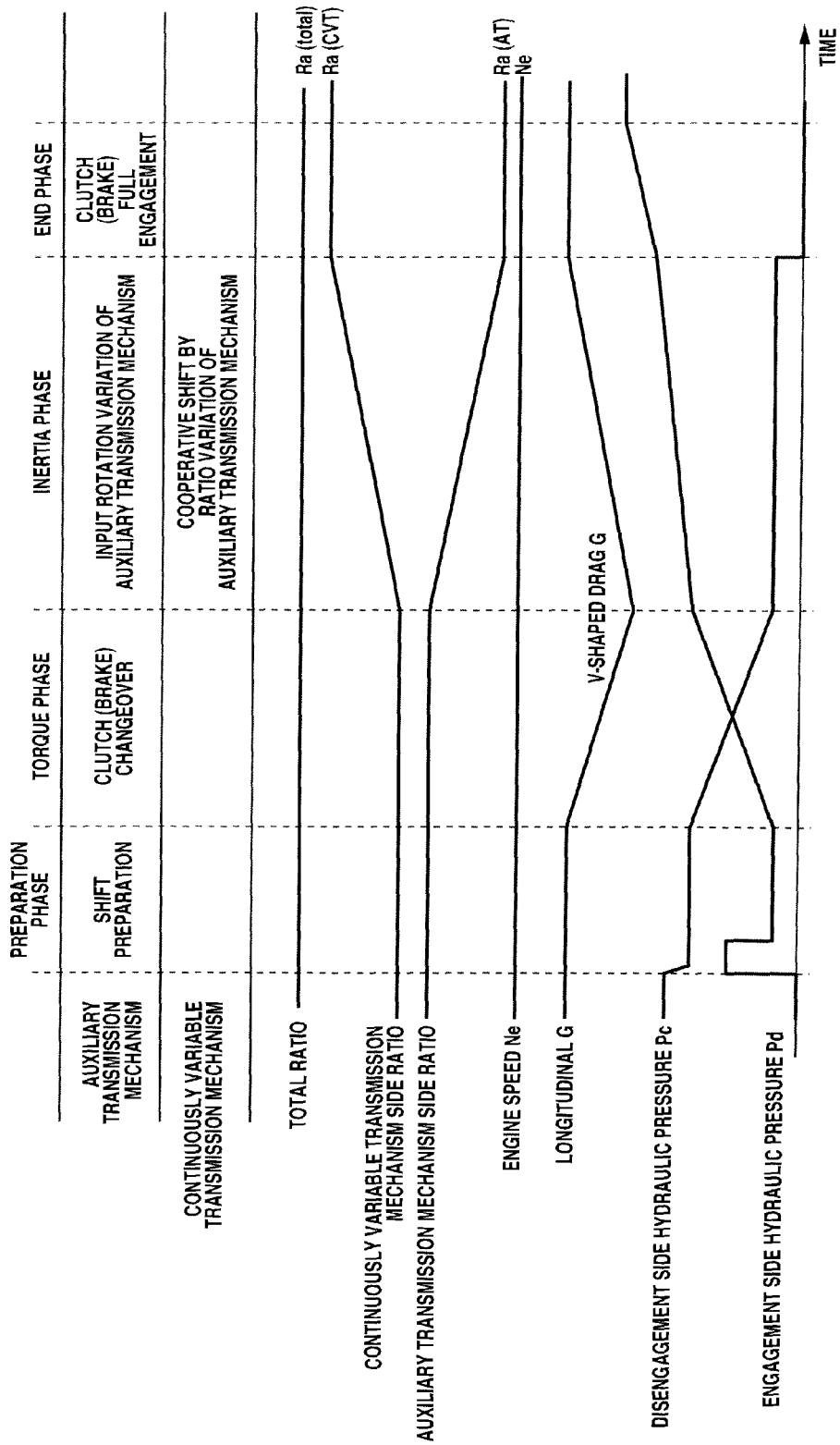
FIG. 4 is a time chart showing a basic control flow of a stepwise variable transmission mechanism of the automatic transmission of FIG. 1.

This shift control operation is referred to as a cooperative shift control operation. As shown in FIG. 4, the variation of the transmission ratio (hereinafter, referred to as auxiliary transmission side ratio) $Ra_{(AT)}$ of auxiliary transmission mechanism 9 which is generated by the switching of the shift stage of auxiliary transmission mechanism 9 is canceled or compensated by the variation of the transmission ratio (hereinafter, referred to as continuously variable transmission side ratio) $Ra_{(CVT)}$ of continuously variable transmission mechanism 8 which is generated by the shift in continuously variable transmission mechanism 8. With this, smooth shift is attained so that the transmission ratio (hereinafter, referred to as total ratio) $Ra_{(total)}$ of automatic transmission 4 does not vary.

For example, when the shift stage of auxiliary transmission mechanism 9 is upshifted from the first forward speed to the second forward speed, continuously variable transmission mechanism 8 is downshifted at the same time of the upshift of auxiliary transmission mechanism 9. With this, the shift can be performed while input rotational speed $N_i$ of automatic transmission 4 which is generated by transmission mechanisms 8 and 9 is maintained unchanged. That is, by the cooperative shift control of automatic transmission 4, it is possible to suppress the inertia torque and the shift shock at the upshift of auxiliary transmission mechanism 9. Accordingly, it is possible to attain the smooth shift as if the shift is performed by continuously variable transmission mechanism 8.

In this way, automatic transmission 4 includes continuously variable transmission mechanism 8 arranged to vary the transmission ratio in the stepless manner, and auxiliary transmission mechanism 9 arranged to select arbitrary shift stage from the plurality of shift stages. Therefore, automatic transmission 4 makes it possible to attain wide transmission ratio.

That is, in automatic transmission 4, hydraulic control valve unit 10 and transmission controller 11 serve as the control section, and continuously variable transmission mechanism 8 and stepwise variable transmission mechanism 9 are combined. With this, automatic transmission 4 including continuously variable transmission mechanism 8 and stepwise variable transmission mechanism 9 can attain the transmission ratio coverage wider than the transmission ratio coverage of one of continuously variable transmission mechanism 8 and stepwise variable transmission mechanism 9.

On the other hand, auxiliary transmission mechanism 9 performs the changeover shift (replacement gearshift) which is performed by disengaging the first engagement portion and engaging the second engagement portion. In this changeover shift, the engagement portion such as the clutch and the brake generates the torque to move input rotational speed $N_{i(AT)}$ of the auxiliary transmission mechanism (the auxiliary transmission side input rotational speed) closer to the rotational speed attained by engaging this engagement portion when the pressing force (the engagement torque) necessary for the engagement is increased. On the other hand, the engagement portion such as the clutch and the brake decreases the torque to move the auxiliary transmission side input rotational speed $N_{i(AT)}$ closer to the rotational speed attained by engaging this engagement portion when the pressing force is decreased.

That is, in a power ON state in which the input torque of automatic transmission 4 is the positive torque (the torque that the input side of automatic transmission 4 becomes the driving side), input rotational speed $N_i$ of automatic transmission 4 is increased when the pressing force necessary for the engagement is decreased. On the other hand, in a power OFF state in which the input torque of automatic transmission 4 is the negative torque (the torque that the output side of automatic transmission becomes the driving side), input rotational speed $N_i$ of automatic transmission 4 is decreased when the pressing force necessary for the engagement is decreased.

On the other hand, high clutch H/C serves as the engagement portion to generate only a function to decrease auxiliary transmission side input rotational speed $N_{i(AT)}$ (automatic transmission input rotational speed $N_i$). Low brake LR/B serves as the engagement portion to generate only a function to increase auxiliary transmission side input rotational speed $N_{i(AT)}$ (automatic transmission input rotational speed $N_i$).

Accordingly, in the changeover shift in the power ON state, high clutch H/C is positively controlled. With this, the increase of auxiliary transmission side input rotational speed $N_{i(AT)}$ is suppressed during an inertia phase that auxiliary transmission side input rotational speed $N_{i(AT)}$ is shifted from the rotational speed before the changeover shift, to the rotational speed after the changeover shift. Consequently, the variation of auxiliary transmission side ratio $Ra_{(AT)}$ is controlled. On the other hand, in the changeover shift in the power OFF state, low brake LR/B is positively controlled. With this, the decrease of auxiliary transmission side input rotational speed $N_{i(AT)}$ is suppressed during the inertia phase. Consequently, the variation of auxiliary transmission side ratio $Ra_{(AT)}$ is controlled.

However, when the power ON/OFF state is switched during the changeover shift, auxiliary transmission side ratio $Ra_{(AT)}$ varies to a ratio different from a target ratio as described below, so that the shift shock may be generated.

For example, when the power state is switched from the power ON state to the power OFF state during the inertia phase, it is not possible to suppress the decrease of auxiliary transmission side input rotational speed $N_{i(AT)}$ which is caused by the switching to the power OFF state, only by high clutch H/C arranged to control auxiliary transmission side input rotational speed $N_{i(AT)}$ in the power ON state. Consequently, the variation of the ratio different from the target ratio is generated in accordance with this decrease of auxiliary transmission side input rotational speed $N_{i(AT)}$.

Contrary, when the power state is switched from the power OFF state to the power ON state during the inertia phase, it is not possible to suppress the increase of auxiliary transmission side input rotational speed $N_{i(AT)}$ which is caused by the switching to the power ON state, only by low brake LR/B arranged to control auxiliary transmission side input rotational speed $N_{i(AT)}$ in the power OFF state. Consequently, the variation of the ratio different from the target ratio is generated in accordance with this increase of auxiliary transmission side input rotational speed $N_{i(AT)}$.

Moreover, when the power state is switched from the power ON state to the power OFF state during a precedent torque phase that is precedent to (prior to) the inertia phase, and that the changeover of the torque is performed by distributing the input torque of the auxiliary transmission mechanism 9 to low brake LR/B and high clutch H/C, it is not possible to suppress the decrease of the auxiliary transmission side input rotational speed $N_{i(AT)}$ which is caused by the switching to the power OFF state, only by high clutch H/C arranged to control auxiliary transmission side input rotational speed $N_{i(AT)}$ in the power ON state. Consequently, the variation of the ratio different from the target ratio is generated in accordance with this decrease of auxiliary transmission side input rotational speed $N_{i(AT)}$.

Similarly, when the power state is switched from the power OFF state to the power ON state during the precedent torque phase, it is not possible to suppress the increase of auxiliary transmission side input rotational speed $N_{i(AT)}$ which is caused by the switching to the power ON state, only by low brake LR/B arranged to control auxiliary transmission side input rotational speed $N_{i(AT)}$ in the power OFF state. Consequently, the variation of the ratio different from the target ratio is generated in accordance with this increase of auxiliary transmission side input rotational speed $N_{i(AT)}$.

Figure 5:
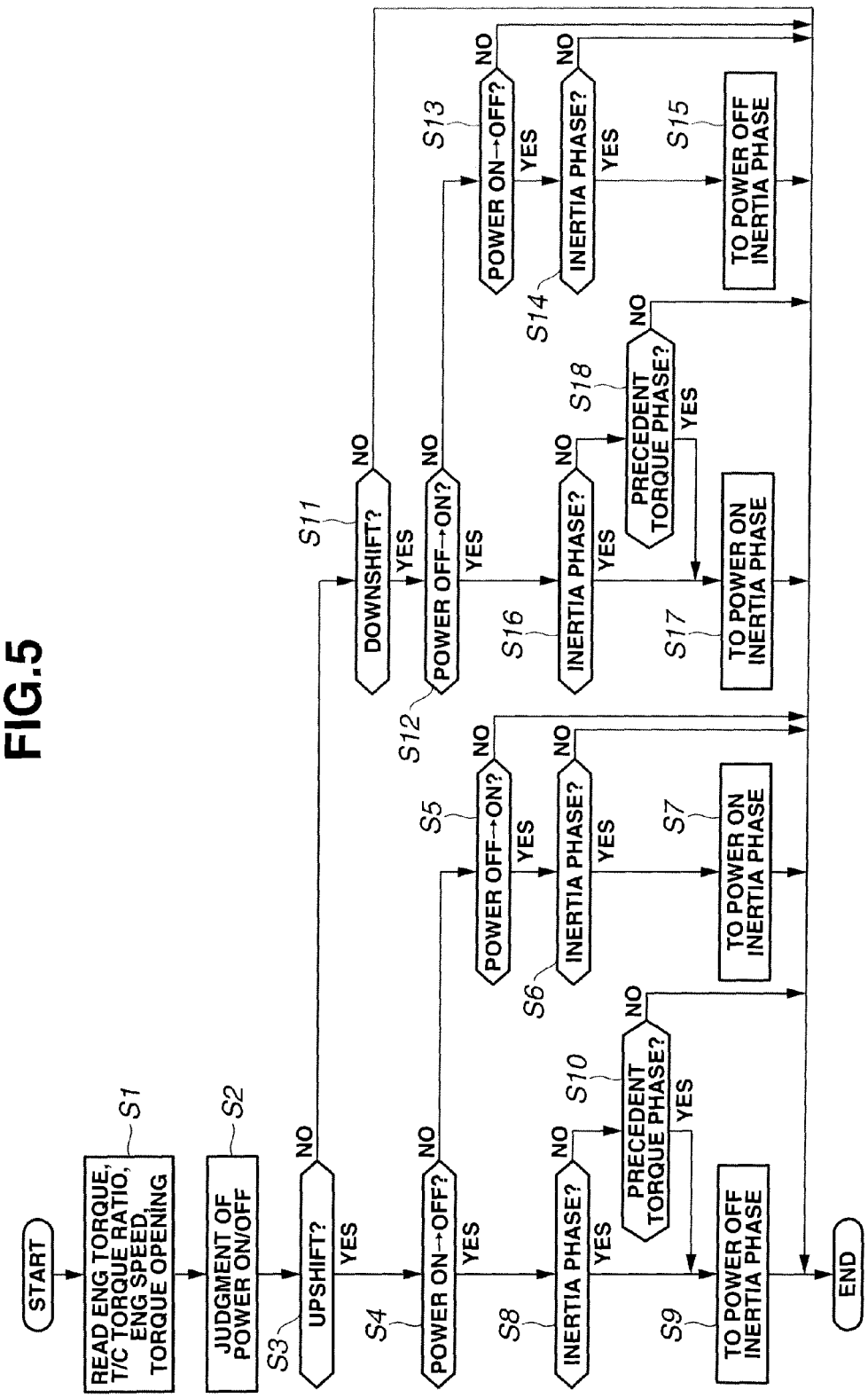
FIG. 5 is a flowchart showing a flow of a control operation performed by the control apparatus of FIG. 1.

FIG. 5 is a flowchart showing a flow of a control operation performed by the control apparatus of FIG. 1. Hereinafter, the shift control operation according to the present invention is illustrated with reference to the flowchart of FIG. 5. The following shift control is performed by controlling the solenoid valves of hydraulic control valve unit 10 by the duty (D) control based on a command calculated by transmission controller 11.

At step S1, shift control section 100 (transmission controller 11) reads engine torque $T_e$, torque converter torque ratio $e_t$, and a torque opening which are calculated by known method, and engine speed $N_e$ from engine speed sensor $S_e$. Subsequently to step S1, the process proceeds to step S2. At step S2, shift control section 100 judges the power ON/OFF state by a predetermined method described later. Subsequent to step S2, the process proceeds to step S3. At step S3, shift control section 100 judges whether or not auxiliary transmission mechanism 9 is during the upshift.

When the answer of step S3 is affirmative (YES) (shift control section 100 judges that auxiliary transmission is during the upshift), the process proceeds to step S4. At step S4, shift control section 100 judges whether or not the power state is switched from the ON state to the OFF state. When the answer of step S4 is negative (NO) (shift control section 100 judges that the power state is not switched from the ON state to the OFF state), the power state may be switched from the power OFF state to the power ON state during the upshift, and the process proceeds to step S5. At step S5, shift control section 100 judges whether or not the power state is switched from the OFF state to the ON state.

When the answer of step S5 is negative (NO) (shift control section 100 judges that the power state is not switched from the OFF state to the ON state), the process is finished since the power ON/OFF state is not switched. When the answer of step S5 is affirmative (YES) (shift control section 100 judges that the power state is switched from the OFF state to the ON state), the power state is switched to the ON state during the upshift, and the process proceeds to step S6. At step S6, shift control section 100 judges whether or not the switching from the power OFF state to the power ON state is performed during the inertia phase.

When the answer of step S6 is negative (NO) (shift control section 100 judges that the switching from the power OFF state to the power ON state is not performed during the inertia phase), the process is finished. When the answer of step S6 is affirmative (YES) (shift control section 100 judges that the switching from the power OFF state to the power ON state is performed during the inertia phase), the power state is switched to the ON state during the inertia phase in a process of the upshift of auxiliary transmission mechanism 9 in the power OFF state. Subsequently to the affirmative answer of step S6, the process proceeds to step S7. At step S7, a power ON inertia phase control operation according to the present invention is performed.

Figure 6:
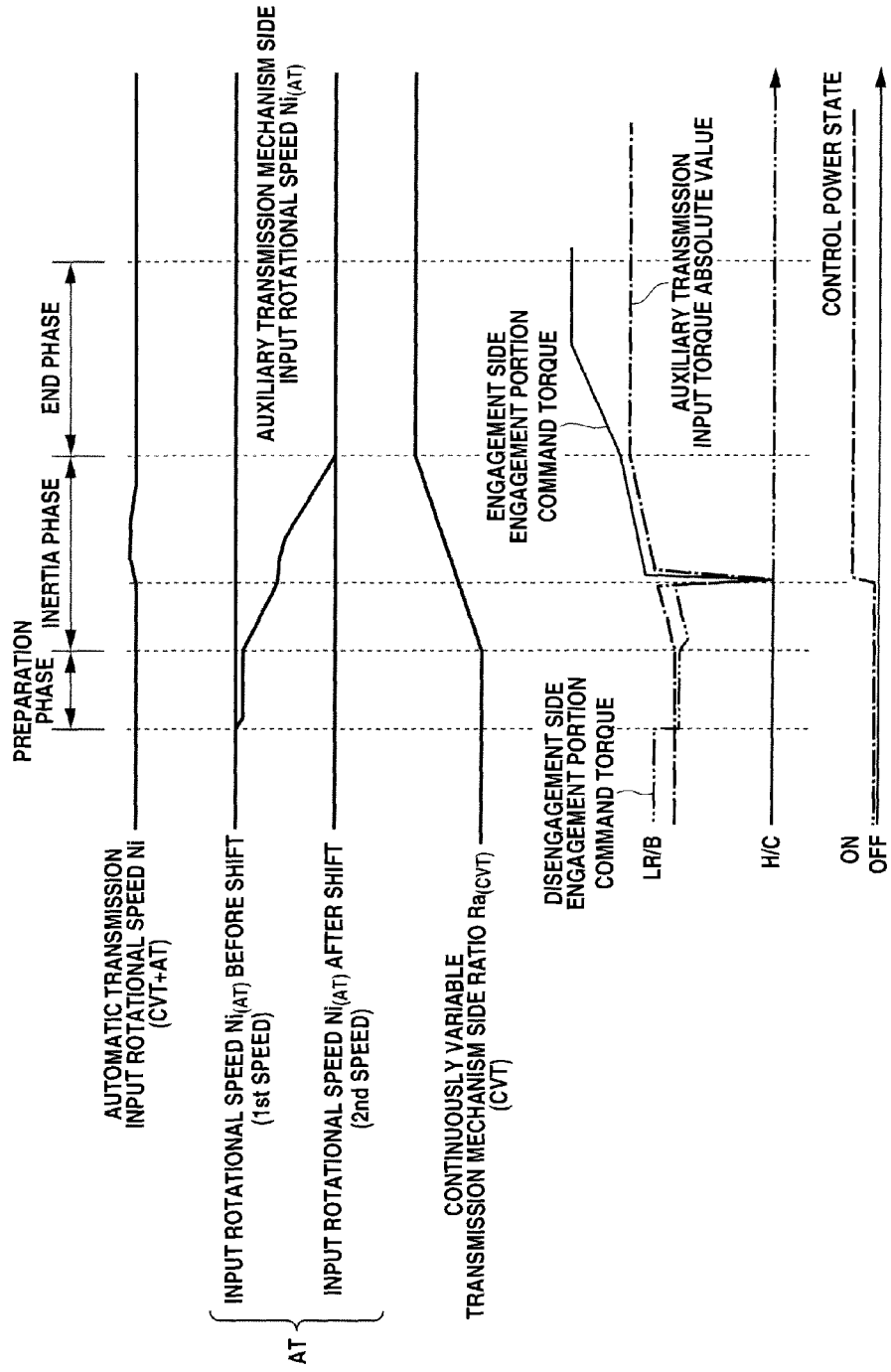
FIG. 6 is a time chart showing a control flow of the stepwise variable transmission mechanism of FIG. 1 when a power state is switched to an ON state during an inertia phase at an upshift in a power OFF state.

As shown in FIG. 6, when the power state is switched to the power ON state, the power ON inertia phase control operation suddenly disengages low brake LR/B (shown by a two-dot chain line) on the disengagement side (the first engagement portion) which is arranged to suppress the decrease of auxiliary transmission side input rotational speed $N_{i(AT)}$ by increasing auxiliary transmission side input rotational speed $N_{i(AT)}$, and suddenly engages high dutch H/C (shown by a solid line) on the engagement side (the second engagement portion) which is during waiting. Consequently, the increase of auxiliary transmission side input rotational speed $N_{i(AT)}$ is suppressed by the function of high dutch H/C to decrease auxiliary transmission side input rotational speed $N_{i(AT)}$.

That is, the torque control of low brake LR/B and high dutch H/C is switched to a state identical to the torque control during the inertia phase at the upshift in the power ON state. Consequently, high dutch H/C on the engagement side suppresses the increase of auxiliary transmission side input rotational speed $N_{i(AT)}$ which is caused by the transmission input torque by the switching from the power OFF state to the power ON state. Accordingly, even when the power state is switched to the ON state by the depression of the accelerator pedal and so on during the inertia phase at the upshift in the power OFF state, unexpected variation of the ratio is not generated in auxiliary transmission mechanism 9, and the variation of the ratio is prevented. Consequently, it is possible to prevent the shift shock generated by the switching to the power ON state during the inertia phase at the upshift in the power OFF state. Therefore, it is possible to attain appropriate shift.

Figure 7:
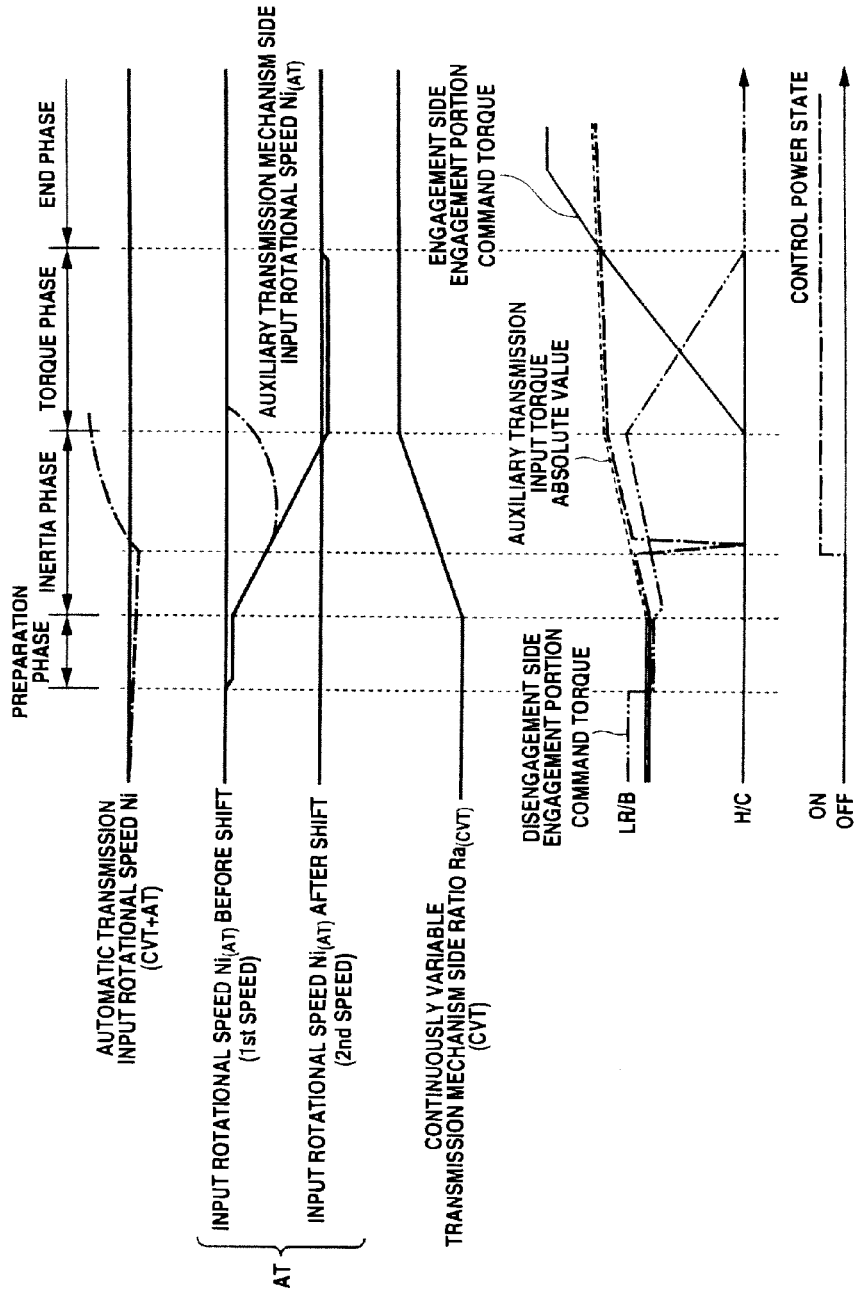
FIG. 7 is a time chart showing a control flow of a conventional stepwise variable transmission mechanism of a comparative example when the power state is switched to the ON state during the inertia phase at the upshift in the power OFF state.

On the other hand, a conventional shift control operation performs merely a control operation at the upshift in the power OFF state, as shown in FIG. 7. This conventional shift control operation judges predetermined slip amounts of low brake LR/B and high clutch H/C before the changeover shift, and the completion of the preparation of the torque transmission of high dutch H/C on the engagement side, and starts the inertia phase. In this case, the input torque to the auxiliary transmission mechanism is negative. Accordingly, low brake LR/B on the disengagement side suppresses the decrease of auxiliary transmission side input rotational speed $N_{i(AT)}$ during the inertia phase. Auxiliary transmission side input rotational speed $N_{i(AT)}$ is controlled so as to follow (attain) the target ratio.

However, when the power state is switched to the power ON state during the inertia phase by the depression of the accelerator pedal and so on, the inertia phase proceeds in auxiliary transmission mechanism 9 so as to reverse that input rotational speed $N_{i(AT)}$ as shown by a chain line of FIG. 7. Therefore, unexpected surge (unexpected sudden increase) of the rotation is generated, and the engagement shock is generated.

Figure 19:
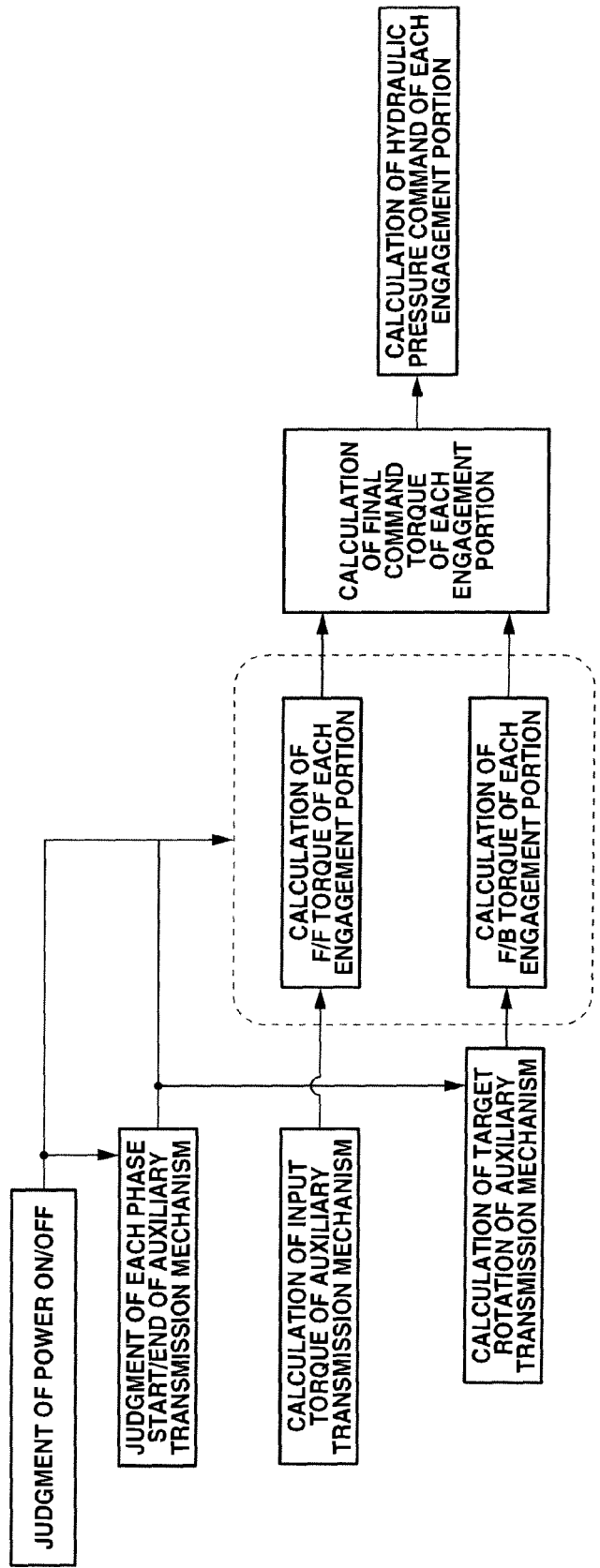
FIG. 19 is a control view showing a method of calculating hydraulic pressure commands to engagement portions on a disengagement side and on an engagement side, in accordance with a switching of the power ON/OFF state, in a transmission controller.

Transmission controller 11 calculates hydraulic pressure commands to the engagement portions on the disengagement side and on the engagement side by a flow shown in FIG. 19. These hydraulic pressure commands are outputted to hydraulic control valve unit 10 for the control operation.

The hydraulic pressure commands on the disengagement side and the engagement side are calculated, respectively, based on the command torque on the engagement side and the command torque on the disengagement side. Moreover, the command torque on the engagement side and the command torque on the disengagement side are calculated, respectively, as sum of F/F torque obtained by the feed forward control and F/B torque obtained by the feedback control. The F/F torque is calculated based on the input torque of auxiliary transmission mechanism 9 (the input torque of automatic transmission 4 in this embodiment) which is constantly calculated. Moreover, the F/B torque is calculated based on the target input rotational speed of auxiliary transmission mechanism 9 (target input rotational speed $N_i(0)$ of automatic transmission 4 in this embodiment) which is calculated based on throttle opening TVO and vehicle speed VSP.

Moreover, the F/F torque and F/B torque are calculated in response to the judgment of the power ON/OFF state, the judgment of start/end of each phase of auxiliary transmission mechanism 9, or the judgment of start/end of each phase of auxiliary transmission mechanism 9 according to the judgment of the power ON/OFF state. In addition, the target input rotational speed of auxiliary transmission mechanism 9 (target input rotational speed $N_i(0)$ of automatic transmission 4 in this embodiment) is calculated in response to the judgment of start/end of each phase of auxiliary transmission mechanism 9, or the judgment of start/end of each phase of auxiliary transmission mechanism 9 according to the judgment of the power ON/OFF state.

On the other hand, when the answer of step S4 is affirmative (YES) (shift control section 100 judges that the power state is switched from the ON state to the OFF state), the power state is switched to the power OFF state at the upshift, and the process proceeds to step S8. At step S8, shift control section 100 judges whether or not this switching from the power ON state to the power OFF state is performed during the inertia phase.

When the answer of step S8 is affirmative (YES) (shift control section 100 judges that the switching from the power ON state to the power OFF state is performed during the inertia phase), the process proceeds to step S9. At step S9, a power OFF inertia phase control operation is performed.

Figure 8:
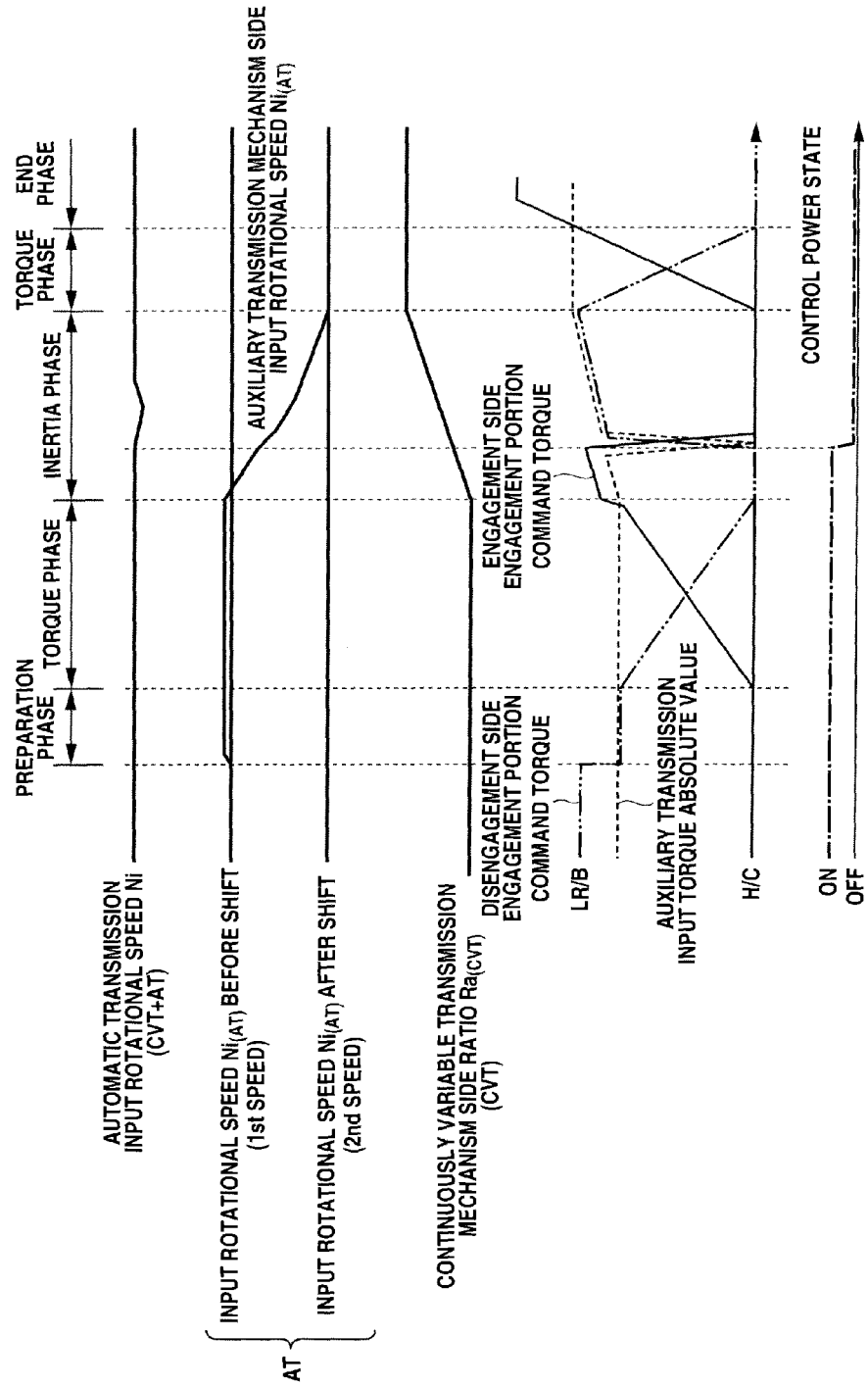
FIG. 8 is a time chart showing a control flow of the stepwise variable transmission mechanism of FIG. 1 when the power state is switched to the OFF state during the inertia phase at the upshift in the power ON state.

As shown in FIG. 8, when the power state is switched to the power OFF state, the power OFF inertia phase control operation suddenly disengages high dutch H/C on the engagement side (the second engagement portion) which is arranged to suppress the increase of auxiliary transmission side input rotational speed $N_{i(AT)}$ by decreasing input rotational speed $N_{i(AT)}$, and suddenly engages low brake LR/B on the disengagement side (the first engagement portion) which is during the waiting. With this, the power OFF inertia phase control operation suppresses the decrease of auxiliary transmission side input rotational speed $N_{i(AT)}$ by the function of low brake LR/B to increase auxiliary transmission side input rotational speed $N_{i(AT)}$.

That is, the torque control of low brake LR/B and high dutch H/C is switched to a state identical to the torque control during the inertia phase at the upshift in the power OFF state. With this, low brake LR/B on the disengagement side suppresses the decrease of auxiliary transmission side input rotational speed $N_{i(AT)}$ which is caused by the auxiliary transmission input torque by the switching from the power ON state to the power OFF state. Accordingly, even when the power state is switched to the OFF state by the release of the accelerator pedal during the inertia phase at the upshift in the power ON state, the unexpected variation of the ratio is not generated in auxiliary transmission mechanism 9, and the variation of the ratio is prevented. Consequently, it is possible to prevent the shift shock generated by the switching to the power OFF state during the inertia phase at the upshift in the power ON state. Therefore, it is possible to attain the appropriate shift.

Figure 9:
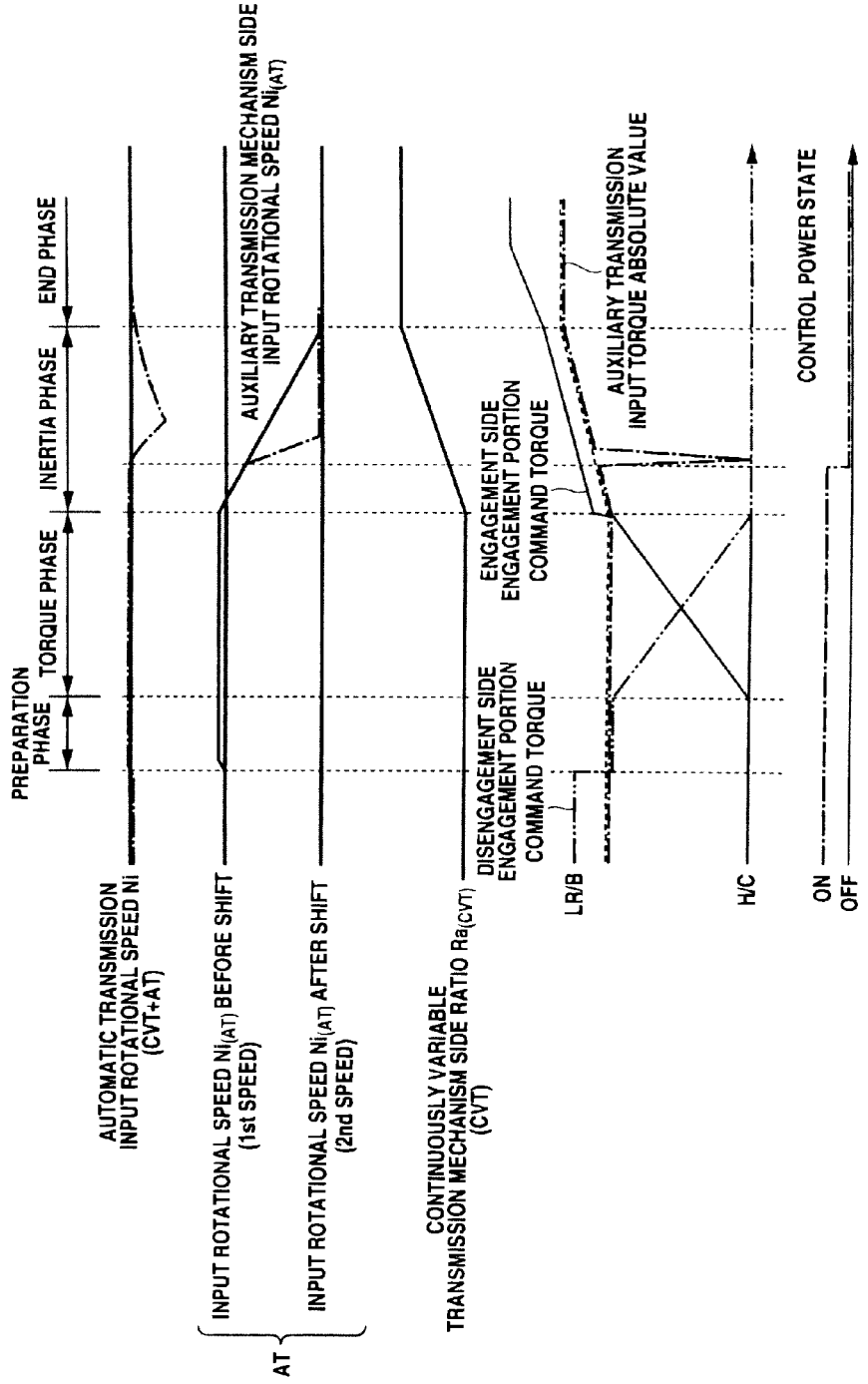
FIG. 9 is a time chart showing a control flow of the conventional stepwise variable transmission mechanism of the comparative example when the power state is switched to the OFF state during the inertia phase at the upshift in the power ON state.

On the other hand, the conventional shift control operation performs merely a control operation at the upshift in the power ON state, as shown in FIG. 9. This conventional shift control operation judges the predetermined slip amounts of low brake LR/B and high clutch H/C before the changeover shift, and the completion of the preparation of the torque transmission of high dutch H/C on the engagement side, and starts the torque phase. Then, the inertia phase starts after the changeover of low brake LR/B and high dutch H/C is finished. In this case, the input torque to auxiliary transmission mechanism 9 is positive. Accordingly, high clutch H/C on the engagement side suppresses the increase of auxiliary transmission side input rotational speed $N_{i(AT)}$ in the inertia phase. Auxiliary transmission side input rotational speed $N_{i(AT)}$ is controlled to follow (attain) the target ratio.

However, when the power state is switched to the power OFF state by the release of the accelerator pedal and so on during the inertia phase, the inertia phase suddenly proceeds in auxiliary transmission mechanism 9 as shown by a chain line of FIG. 9. Therefore, the unexpected sudden variation of the rotation, and the shift shock are generated.

On the other hand, when the answer of step S8 is negative (NO) (shift control section 100 judges that the switching from the power ON state to the power OFF state is not performed during the inertia phase), the process proceeds to step S10. At step S10, shift control section 100 judges whether or not the switching from the power ON state to the power OFF state is performed during the precedent torque phase.

When the answer of step S10 is negative (NO) (shift control section 100 judges that the switching from the power ON state to the power OFF state is not performed during the precedent torque phase), the process is finished. When the answer of step S10 is affirmative (YES) (shift control section 100 judges that the switching from the power ON state to the power OFF state is performed during the precedent torque phase), the process proceeds to step S9. At step S9, the power OFF inertia phase control operation according to the present invention is performed.

Figure 10:
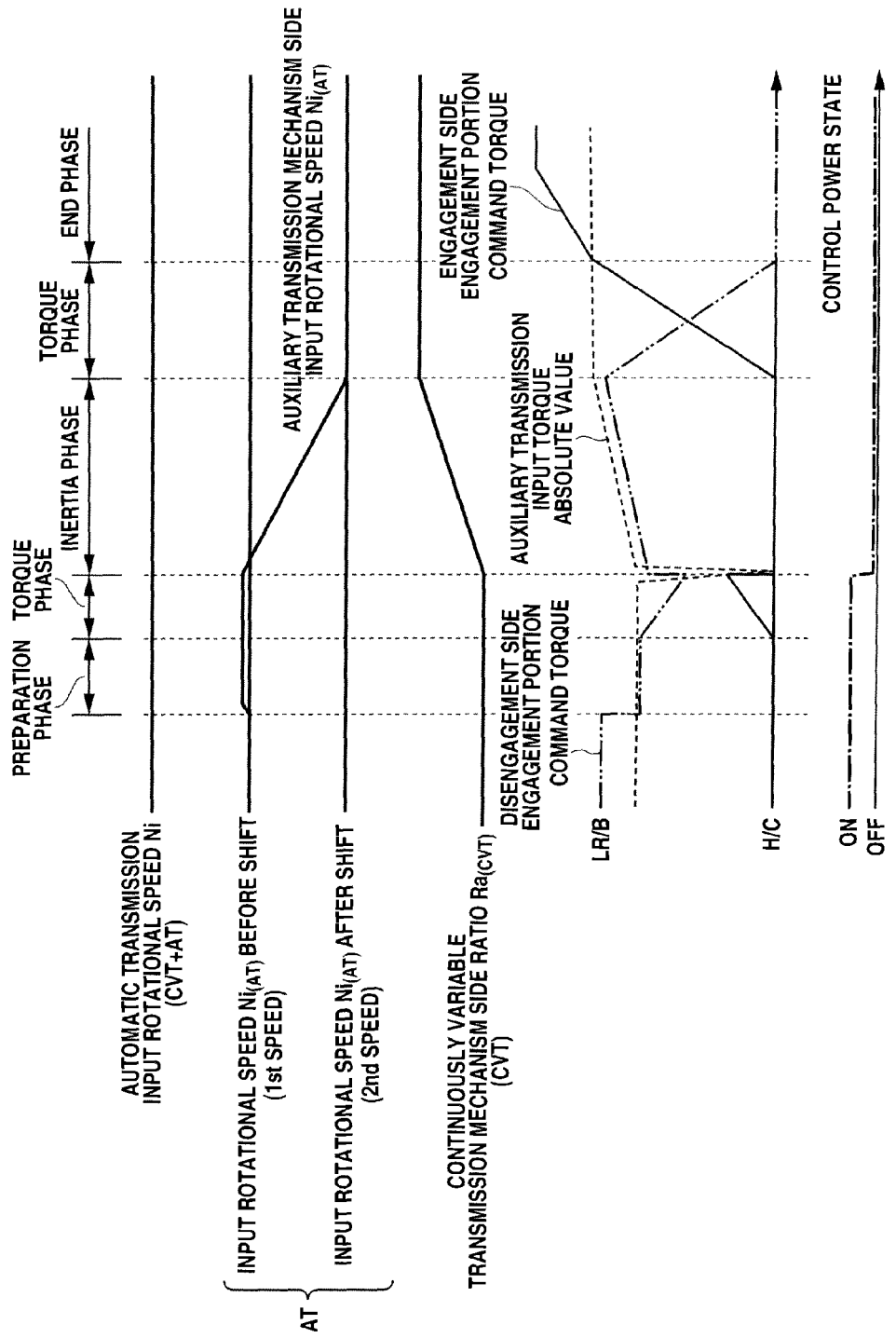
FIG. 10 is a time chart showing a control flow of the stepwise variable transmission mechanism of FIG. 1 when the power state is switched to the OFF state during a precedent torque phase at the upshift in the power ON state.

As shown in FIG. 10, in this power OFF inertia phase control operation, the phase is shifted from the precedent torque phase to the inertia phase when the power state is switched to the power OFF state. The power OFF inertia phase control operation suddenly disengages high clutch H/C (the second engagement portion) which is engaging, and whose the torque capacity is increased by the changeover of the torque during the torque phase, and suddenly engages low brake LR/B (the first engagement portion) which is disengaging, and whose the torque capacity is decreased. With this, the power OFF inertia phase control operation suppresses the decrease of auxiliary transmission side input rotational speed $N_{i(AT)}$ by the function of the low brake LR/B arranged to increase auxiliary transmission side input rotational speed $N_{i(AT)}$.

That is, the torque control of low brake LR/B and high clutch H/C is switched to a state identical to the torque control during the inertia phase at the upshift in the power OFF state. With this, low brake LR/B on the disengagement side suppresses the decrease of auxiliary transmission side input rotational speed $N_{i(AT)}$ which is caused by the input torque of the auxiliary transmission by the switching from the power ON state to the power OFF state. Accordingly, even when the power state is switched to the OFF state by the release of the accelerator pedal and so on during the precedent torque phase at the upshift in the power ON state, the unexpected variation of the ratio is not generated, and the variation of the ratio is prevented. Consequently, it is possible to prevent the shift shock generated by the switching to the power OFF state during the precedent torque phase at the upshift in the power ON state. Therefore, it is possible to attain the appropriate shift.

Figure 11:
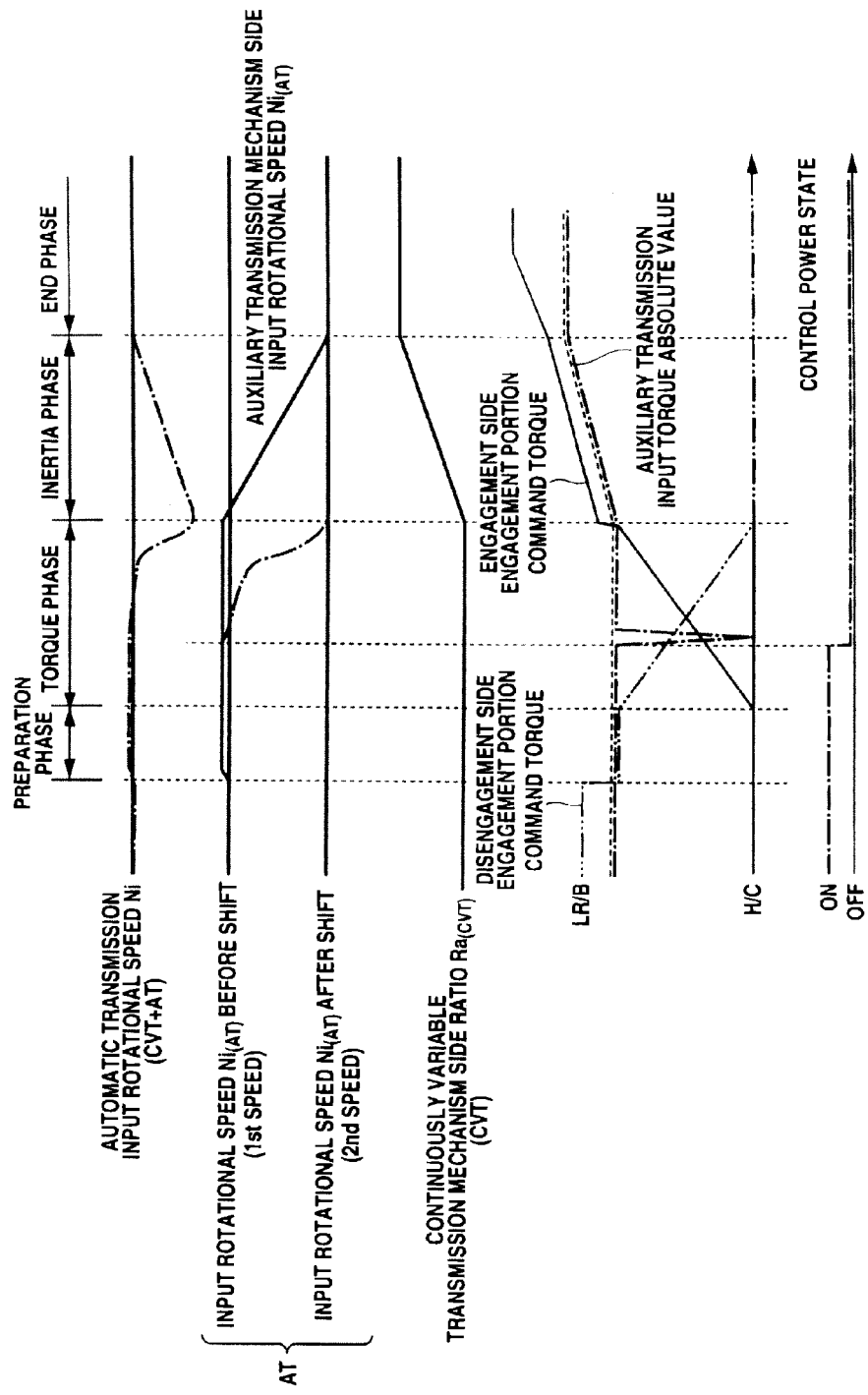
FIG. 11 is a time chart showing a control flow of the conventional stepwise variable transmission mechanism of the comparative example when the power state is switched to the OFF state during the precedent torque phase at the upshift in the power ON state.

On the other hand, as shown in FIG. 11, in the conventional shift control operation, the torque phase is antecedent to the inertia phase, merely as the control operation at the upshift in the power ON state, like the illustration in FIG. 10. In this precedent torque phase, the input torque to auxiliary transmission mechanism 9 is positive. This positive input torque suppresses the increase of auxiliary transmission side input rotational speed $N_{i(AT)}$. The changeover of the torque from low brake LR/B to high clutch H/C is performed so as not to generate the surge (sudden increase) of input rotational speed $N_{i(AT)}$.

However, when the power state is switched to the power OFF state during the precedent torque phase by the release of the accelerator pedal and so on, the inertia phase suddenly proceeds in auxiliary transmission mechanism 9, as shown by a chain line of FIG. 11, like the switching to the power OFF state during the inertia phase at the upshift in the power ON state. Therefore, the unexpected sudden variation of the rotation and the shift shock are generated.

On the other hand, when the answer of step S3 is negative (NO) (shift control section 100 judges that auxiliary transmission mechanism 9 is not during the upshift), the process proceeds to step S11. At step S11, shift control section 100 judges whether or not auxiliary transmission mechanism 9 is during the downshift. When the answer of step S11 is negative (NO) (shift control section 100 judges that auxiliary transmission mechanism 9 is not during the downshift), auxiliary transmission mechanism 9 is not in the shift state, and the process is finished. When the answer of step S11 is affirmative (YES) (shift control section 100 judges that auxiliary transmission mechanism 9 is during the downshift), the process proceeds to step S12. At step S12, shift control section 100 judges whether or not the power state is switched from the OFF state to the ON state.

When the answer of step S12 is negative (NO) (shift control section 100 judges that the power state is not switched from the OFF state to the ON state), the process proceeds to step S13. At step S13, shift control section 100 judges whether or not the power state is switched from the ON state to the OFF state. When the answer of step S13 is negative (NO) (shift control section 100 judges that the power state in not switched from the ON state to the OFF state), there is not the switching of the power ON/OFF state, and the process is finished. When the answer of step S13 is affirmative (YES) (shift control section 100 judges that the power state is switched from the ON state to the OFF state), the process proceeds to step S14. At step S14, shift control section 100 judges whether or not the switching from the power ON state to the power OFF state is performed during the inertia phase.

When the answer of step S14 is negative (NO) (shift control section 100 judges that the switching from the power ON state to the power OFF state is not performed during the inertia phase), the process is finished. When the answer of step S14 is affirmative (YES) (shift control section 100 judges that the switching from the power ON state to the power OFF state is performed during the inertia phase), the power state is switched from the ON state to the OFF state during the inertia phase in a process of the downshift of auxiliary transmission mechanism 9 in the power ON state, and the process proceeds to step S15. At step S15, the power OFF inertia phase control operation according to the present invention is performed.

Figure 12:
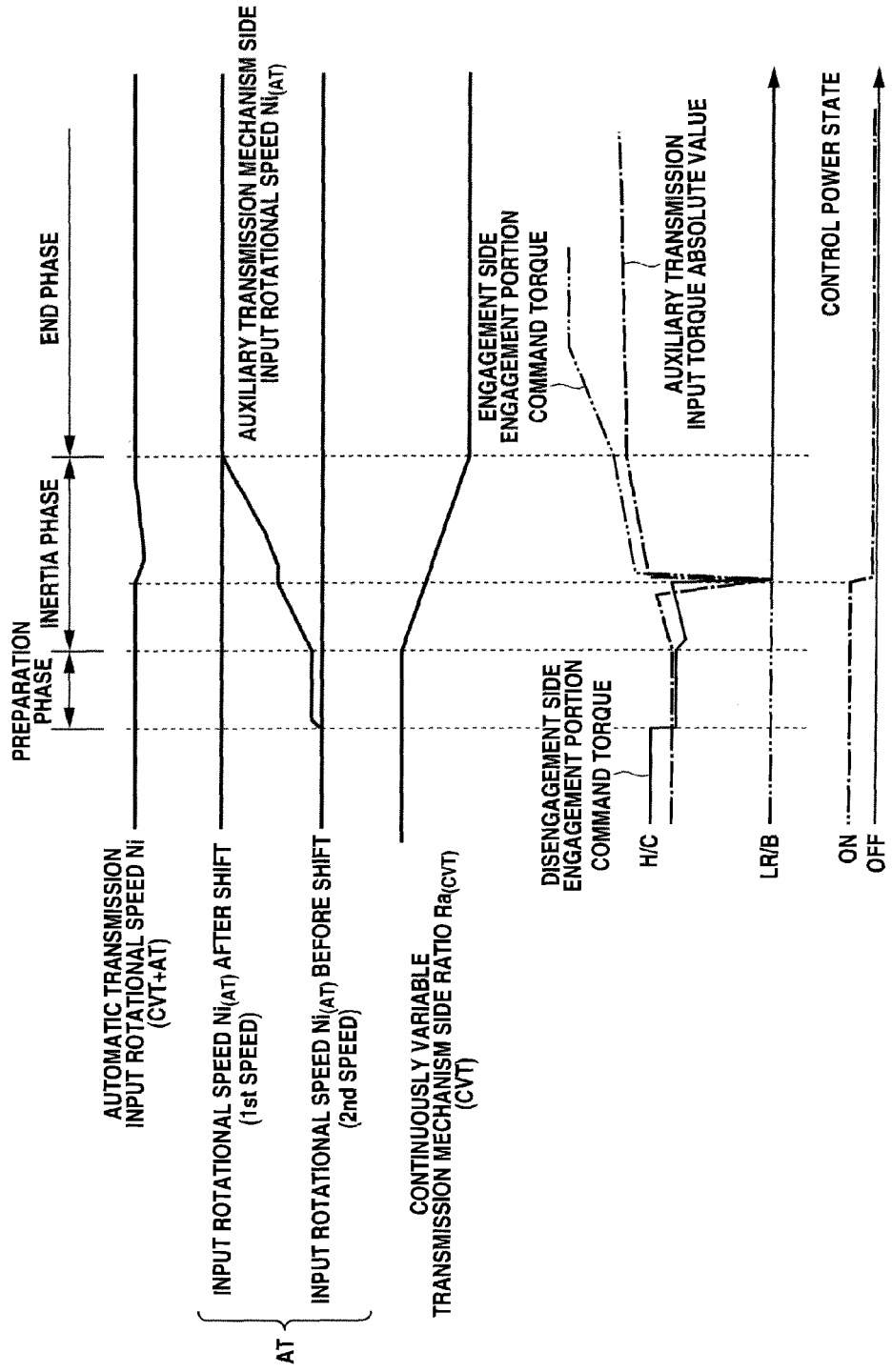
FIG. 12 is a time chart showing a control flow of the stepwise variable transmission mechanism of FIG. 1 when the power state is switched to the OFF state during the inertia phase at a downshift in the power ON state.

As shown in FIG. 12, the power OFF inertia phase control operation suddenly disengages high clutch H/C on the disengagement side (the first engagement portion) which is arranged to suppress the increase of auxiliary transmission side input rotational speed $N_{i(AT)}$ by decreasing input rotational speed $N_{i(AT)}$, and suddenly engages low brake LR/B on the engagement side (the second engagement portion) which is during the waiting. With this, the power OFF inertia phase control operation suppresses the decrease of auxiliary transmission side input rotational speed $N_{i(AT)}$ by the function of low brake LR/B to increase auxiliary transmission side input rotational speed $N_{i(AT)}$.

That is, the torque control of low brake LR/B and high clutch H/C is switched to a state identical to the torque control during the inertia phase at the downshift in the power OFF state. With this, low brake LR/B on the engagement side suppresses the decrease of auxiliary transmission side input rotational speed $N_{i(AT)}$ which is caused by the transmission input torque by the switching of the power from the ON state to the OFF state. Therefore, even when the power state is switched to the OFF state by the release of the accelerator pedal and so on during the inertia phase at the downshift in the power ON state, the unexpected variation of the ratio of auxiliary transmission mechanism 9 is not generated, and the variation of the ratio is prevented. By the control apparatus according to the present invention, it is possible to prevent the shift shock generated by the switching to the power OFF state during the inertia phase at the downshift in the power ON state. Accordingly, it is possible to attain the appropriate shift.

Figure 13:
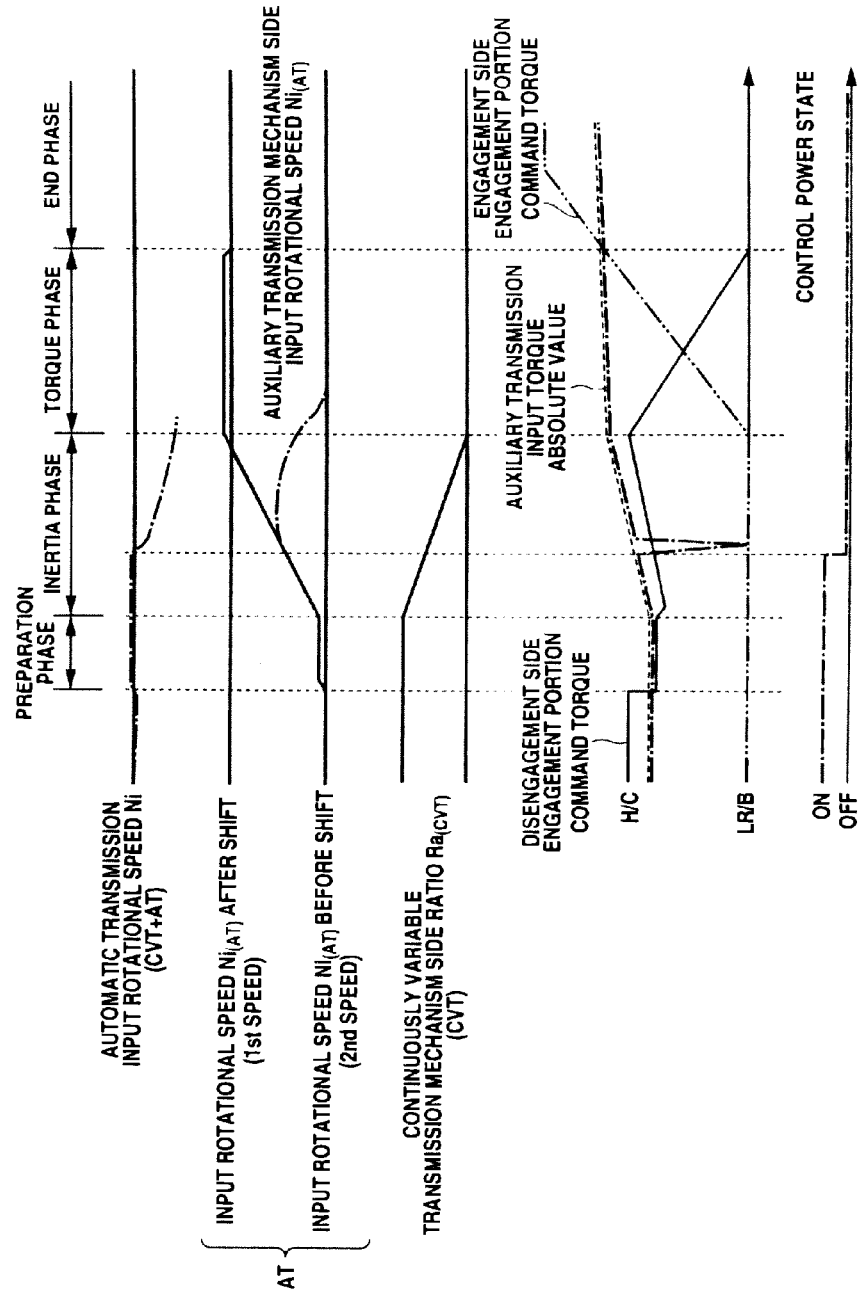
FIG. 13 is a time chart showing a control flow of the conventional stepwise variable transmission mechanism of the comparative example when the power state is switched to the OFF state during the inertia phase at the downshift in the power ON state.

On the other hand, the conventional shift control operation performs merely the control operation at the downshift in the power ON state, as shown in FIG. 13. The conventional shift control operation judges the predetermined slip amounts of low brake LR/B and high clutch H/C before the changeover shift, and the completion of the preparation of the torque transmission of high clutch H/C on the engagement side, and starts the inertia phase. In this case, the input torque to the auxiliary transmission mechanism is positive. Accordingly, high clutch H/C on the disengagement side suppresses the increase of auxiliary transmission side input rotational speed $N_{i(AT)}$ during the inertia phase. Auxiliary transmission side input rotational speed $N_{i(AT)}$ is controlled to follow (attain) the target ratio.

However, when the power state is switched to the OFF state during the inertia phase by the release of the accelerator pedal and so on, the inertia phase proceeds in auxiliary transmission mechanism 9 so as to reverse that input rotational speed $N_{i(AT)}$, as shown in a chain line of FIG. 13. Accordingly, the unexpected decrease of the rotation and the shift shock are generated.

On the other hand, when the answer of step S12 is affirmative (YES) (shift control section 100 judges that the power state is switched from the OFF state to the ON state), the power state is switched to the ON state at the downshift, and the process proceeds to step S16. At step S16, shift control section 100 judges whether or not the switching from the power OFF state to the power ON state is performed during the inertia phase.

When the answer of step S16 is affirmative (YES) (shift control section 100 judges that the switching from the power OFF state to the power ON state is performed during the inertia phase), the process proceeds to step S17. At step S17, the power ON inertia phase control operation according to the present invention is performed.

Figure 14:
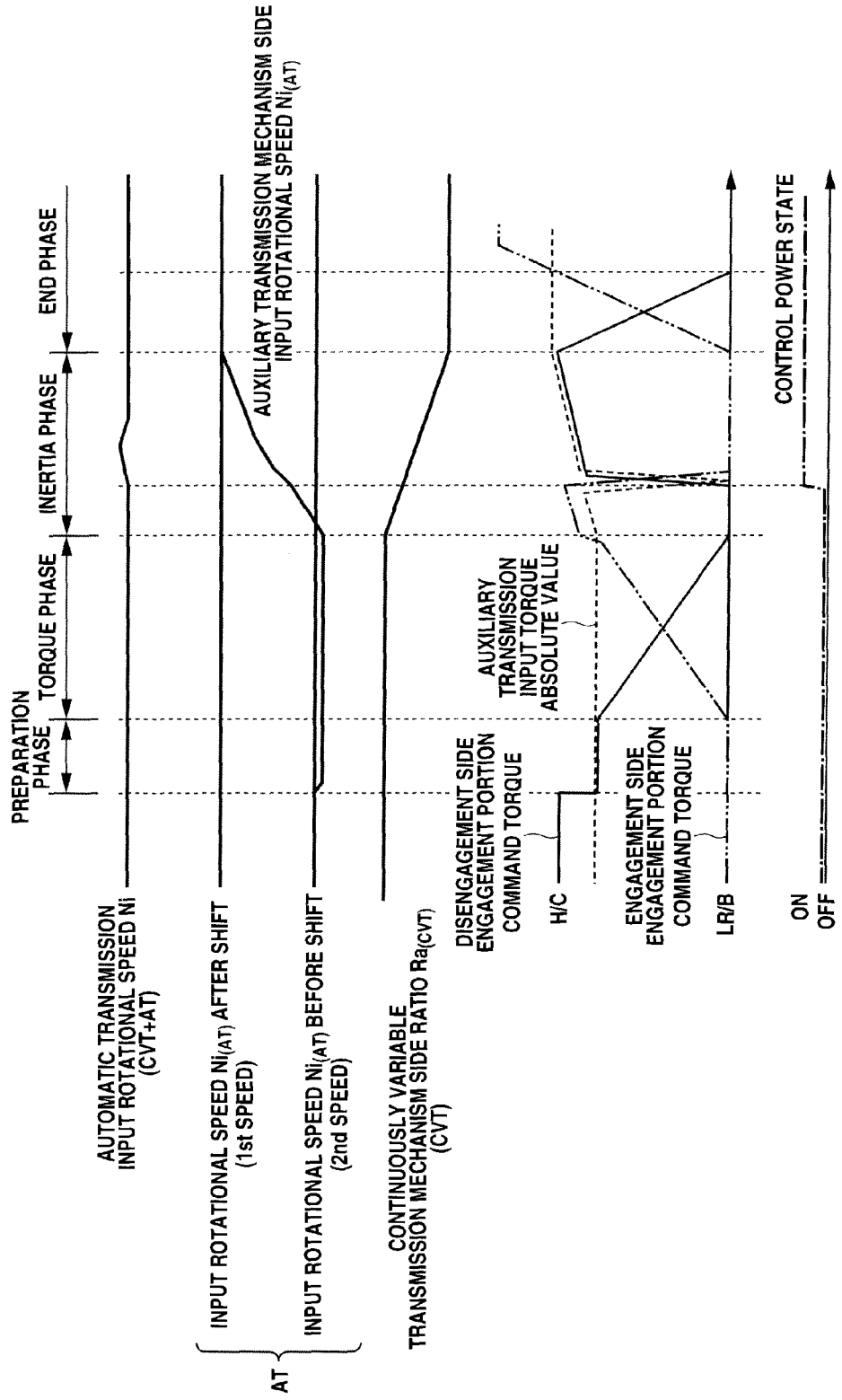
FIG. 14 is a time chart showing a control flow of the stepwise variable transmission mechanism of FIG. 1 when the power state is switched to the ON state during the inertia phase at the downshift in the power OFF state.

As shown in FIG. 14, when the power state is switched to the power ON state, the power ON inertia phase control operation suddenly disengages low brake LR/B on the engagement side (the second engagement portion) which is arranged to suppress the decrease of auxiliary transmission side input rotational speed $N_{i(AT)}$ by increasing input rotational speed $N_{i(AT)}$, and suddenly engages high clutch H/C on the disengagement side (the first engagement portion) which is during the waiting. With this, the power ON inertia phase control operation suppresses the increase of auxiliary transmission side input rotational speed $N_{i(AT)}$ by the function of high clutch H/C to decrease auxiliary transmission side input rotational speed $N_{i(AT)}$.

That is, the torque control of low brake LR/B and high clutch H/C is switched to a state identical to the torque control during the inertia phase at the downshift in the power ON state. With this, high clutch H/C on the disengagement side suppresses the increase of auxiliary transmission side input rotational speed $N_{i(AT)}$ which is caused by the input torque of the auxiliary transmission by the switching from the power OFF state to the power ON state. Therefore, even when the power state is switched to the ON state by the depression of the accelerator pedal and so on during the inertia phase at the downshift in the power OFF state, the unexpected variation of the ratio of auxiliary transmission mechanism 9 is not generated, and the variation of the ratio is prevented. By the control apparatus according to the present invention, it is possible to prevent the shift shock generated by the switching to the power ON state during the inertia phase at the downshift in the power OFF state. Therefore, it is possible to attain the appropriate shift.

Figure 15:
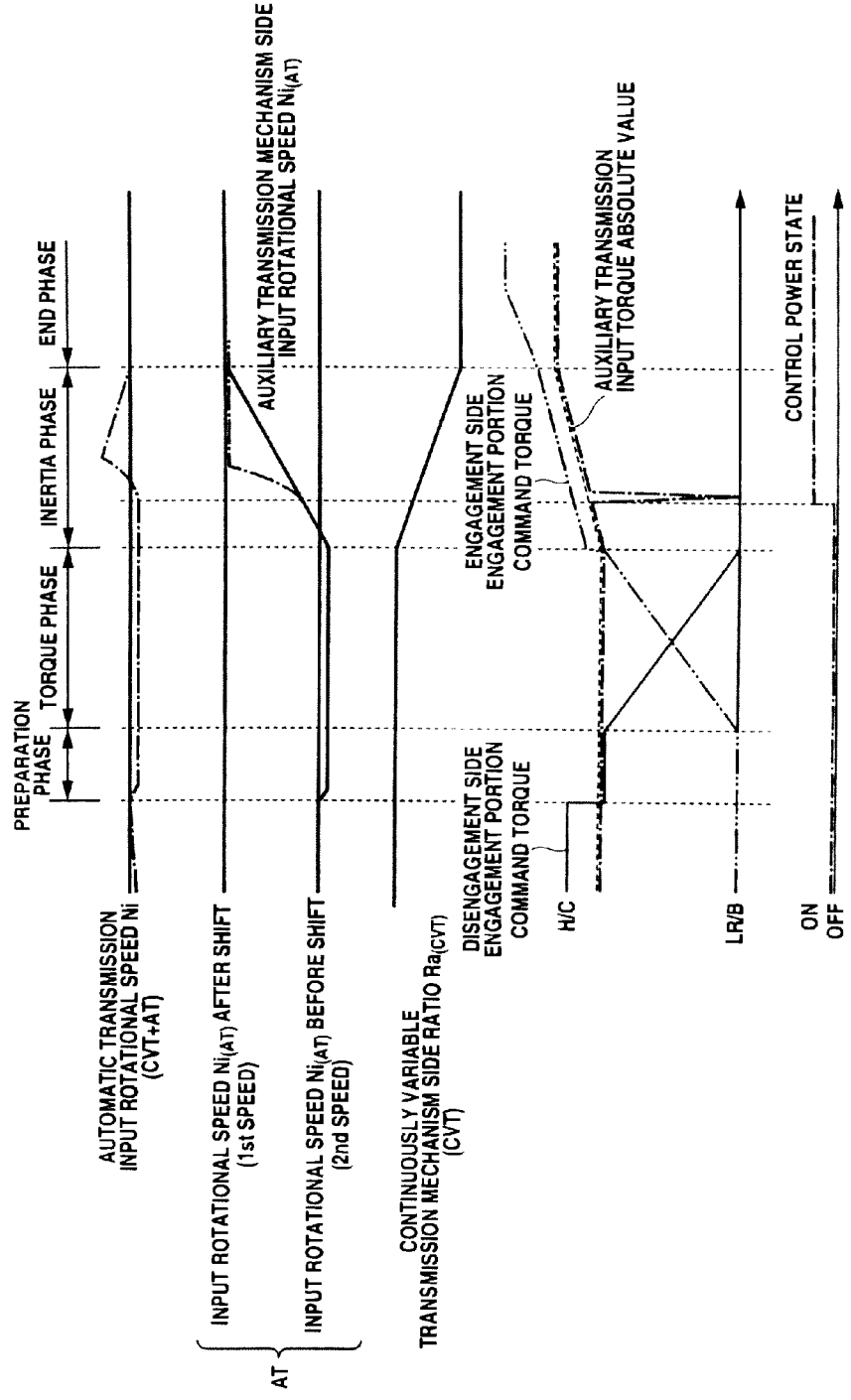
FIG. 15 is a time chart showing a control flow of the conventional stepwise variable transmission mechanism of the comparative example when the power state is switched to the ON state during the inertia phase at the downshift in the power OFF state.

On the other hand, as shown in FIG. 15, the conventional shift control operation performs merely the control operation at the downshift in the power OFF state. The conventional shift control operation judges the predetermined slip amounts of low brake LR/B and high clutch H/C before the changeover shift, and the completion of the torque transmission of high clutch H/C on the engagement side, and starts the torque phase. The inertia phase starts after the completion of the changeover of low brake LR/B and high clutch H/C. In this case, the input torque to the auxiliary transmission mechanism is negative. Accordingly, low brake LR/B on the engagement side suppresses the decrease of auxiliary transmission side rotational speed $N_{i(AT)}$ in the inertia phase. Auxiliary transmission side input rotational speed $N_{i(AT)}$ is controlled so as to follow (attain) the target ratio.

However, the inertia phase suddenly proceeds in auxiliary transmission mechanism 9 as shown by a chain line of FIG. 15 when the power state is switched to the ON state by the depression of the accelerator pedal and so on during the inertia phase. Therefore, the unexpected sudden variation of the rotation and the shift shock generate.

On the other hand, when the answer of step S16 is negative (NO) (shift control section 100 judges that the power state is not switched to the ON state during the inertia phase), the process proceeds to step S18. At step S18, shift control section 100 judges whether or not the switching from the power OFF state to the power ON state is performed during the precedent torque phase.

When the answer of step S18 is negative (NO) (shift control section 100 judges that the switching from the power OFF state to the power ON state is not performed during the precedent torque phase), the process is finished. When the answer of step S18 is affirmative (YES) (the switching from the power OFF state to the power ON state is performed during the precedent torque phase), the process proceeds to step S17. At step S17, the power ON inertia phase control operation according to the present invention is performed.

Figure 16:
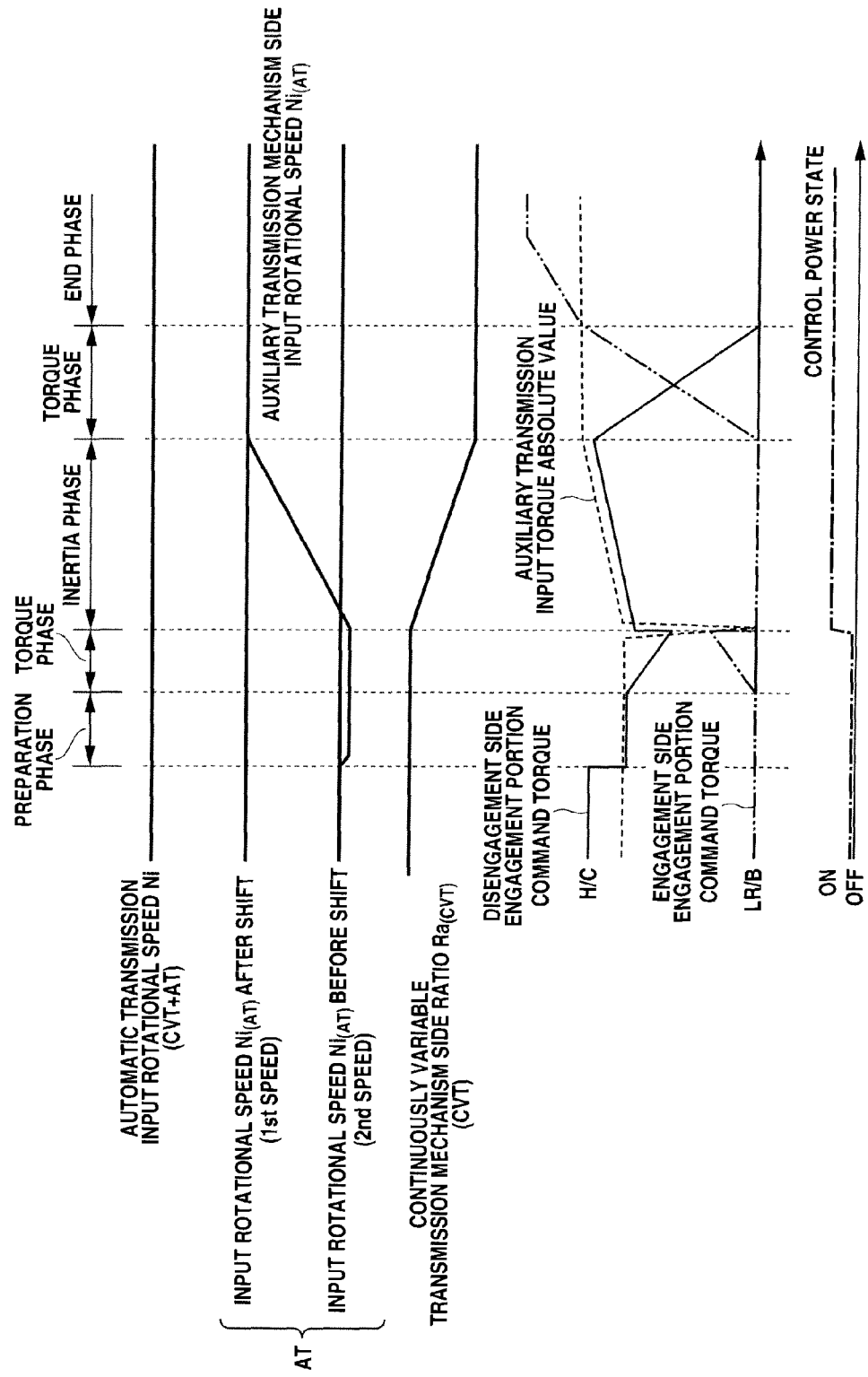
FIG. 16 is a time chart showing a control flow of the stepwise variable transmission mechanism of FIG. 1 when the power state is switched to the ON state during the precedent torque phase at the downshift in the power OFF state.

As shown in FIG. 16, in the power ON inertia phase control operation, the phase is shifted from the precedent torque phase to the inertia phase when the power state is switched to the power ON state. The power ON inertia phase control operation suddenly disengages low brake LR/B (the second engagement portion) which is engaging, and whose the torque capacity is increased by the changeover of the torque during the torque phase, and suddenly engages high clutch H/C which is disengaging, and whose the torque capacity is decreased. With this, the power ON inertia phase control operation suppresses the increase of auxiliary transmission side input rotational speed $N_{i(AT)}$ by the function of high clutch H/C to decrease auxiliary transmission side input rotational speed $N_{i(AT)}$.

That is, the torque control of low brake LR/B and high clutch H/C is switched to a state identical to the torque control during the inertia phase at the downshift in the power ON state. With this, high clutch H/C on the disengagement side suppresses the increase of auxiliary transmission side input rotational speed $N_{i(AT)}$ which is caused by the auxiliary transmission input torque by the switching from the power OFF state to the power ON state. Therefore, even when the power state is switched to the ON state by the depression of the accelerator pedal and so on during the precedent torque phase at the downshift in the power OFF state, the unexpected variation of the ratio of auxiliary transmission mechanism 9 is not generated, and the variation of the ratio is prevented. By the control apparatus according to the present invention, it is possible to prevent the shift shock generated by the switching to the power ON state during the precedent torque phase at the downshift in the power OFF state. Therefore, it is possible to attain the appropriate shift.

Figure 17:
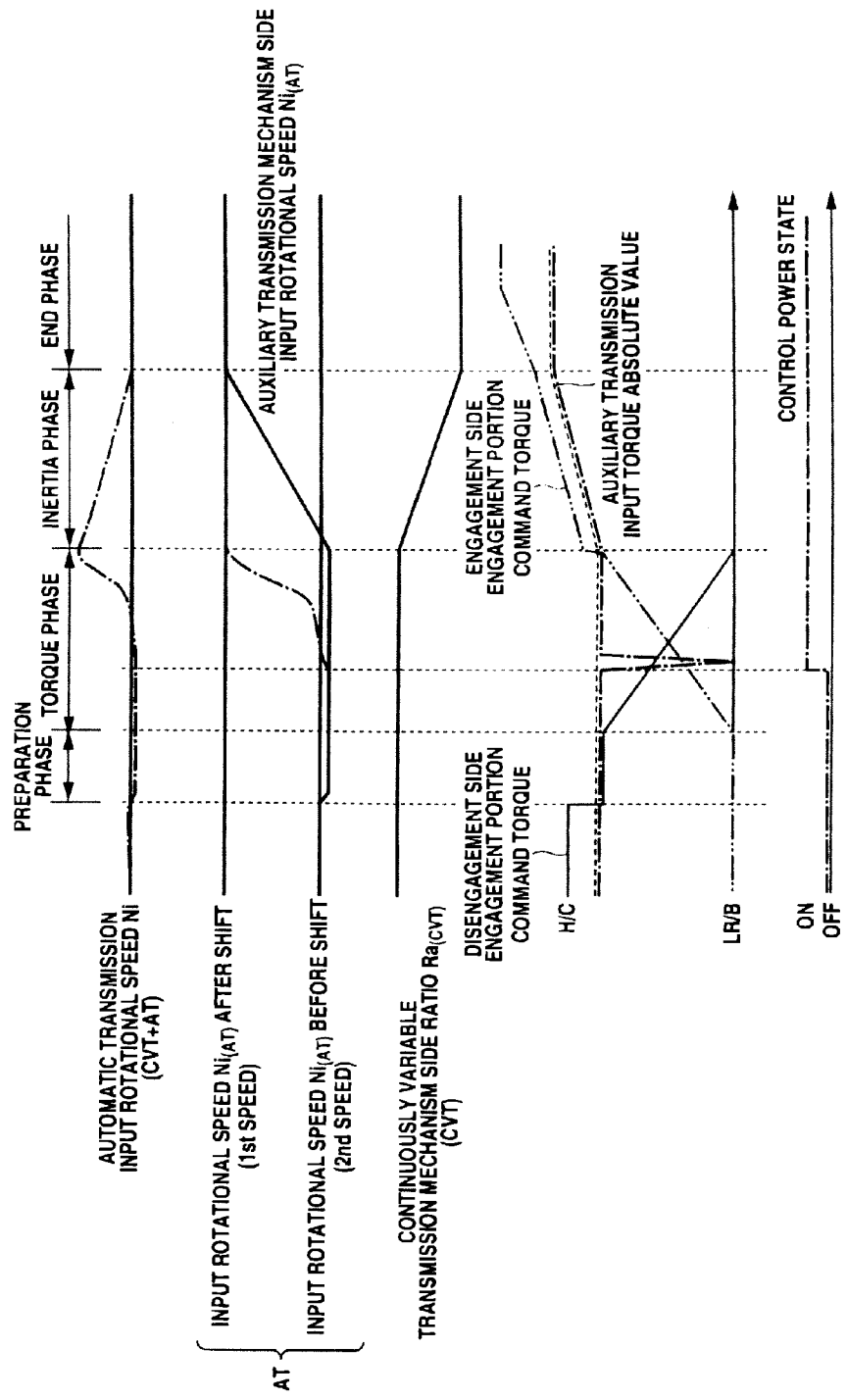
FIG. 17 is a time chart showing a control flow of the conventional stepwise variable transmission mechanism of the comparative example when the power state is switched to the ON state during the precedent torque phase at the downshift in the power OFF state.

On the other hand, as shown in FIG. 17, in the conventional shift control operation, the torque phase is antecedent to the inertia phase, merely as the control operation at the downshift in the power OFF state, like the illustration in FIG. 15. In this precedent torque phase, the input torque of the auxiliary transmission mechanism is negative. This negative input torque suppresses the decrease of auxiliary transmission side input rotational speed $N_{i(AT)}$, and the changeover of the torque from high clutch H/C to low brake LR/B is performed so as not to generate the decrease of input rotational speed $N_{i(AT)}$.

However, when the power state is switched to the ON state by the depression of the accelerator pedal and so on during the precedent torque phase, the inertia phase suddenly proceeds in auxiliary transmission mechanism 9, as shown in a chain line of FIG. 17, like the switching to the power ON state during the inertia phase at the downshift in the power OFF state. Therefore, the unexpected sudden variation of the rotation and the shift shock generate.

In this example, as mentioned above, even when the power ON/OFF state is switched in a process that the shift control is performed so that input rotational speed $N_{i(AT)}$ of auxiliary transmission mechanism 9 becomes target input rotational speed $N_{i(AT)}(0)$ by the changeover between high clutch H/C and low brake LR/B, the unexpected variation of the ratio in auxiliary transmission mechanism 9 is not generated, and the variation of the ratio is prevented. Accordingly, by the control apparatus according to the present invention, it is possible to prevent the shift shock caused by the switching of the power ON/OFF state in the process that the shift control is performed so that input rotational speed $N_{i(AT)}$ becomes target input rotational speed $N_{i(AT)}(0)$ by the changeover between high clutch H/C and low brake LR/B.

In particular, as mentioned above, in case of the switching to the power ON state during the inertia phase at the upshift in the power OFF state, and the switching to the power OFF state during the inertia phase at the downshift in the power ON state, the engagement portion on the disengagement side is disengaged, and the engagement portion on the engagement side is engaged so as to perform the changeover shift control at the engagement portion on the engagement side. With this, even when the power ON/OFF state is switched during the inertia phase, the unexpected variation of the ratio is not generated in auxiliary transmission mechanism 9, and the variation of the ratio is prevented. Accordingly, in this example, it is possible to prevent the shift shock caused by the switching of the power ON/OFF state during the inertia phase.

Moreover, in case of the switching to the power OFF state during the inertia phase at the upshift in the power ON state, and the switching to the power ON state during the inertia phase at the downshift in the power OFF state, when the power ON/OFF state is switched during the inertia phase, the engagement portion on the disengagement side is engaged, and the engagement portion on the engagement side is disengaged so as to perform the changeover shift control at the engagement portion on the engagement side. With this, even when the power ON/OFF state is switched during the inertia torque phase, the unexpected variation of the ratio is not generated in auxiliary transmission mechanism 9, and the variation of the ratio is prevented. Accordingly, in this example, it is possible to prevent the shift shock caused by the switching of the power ON/OFF state during the inertia phase.

Moreover, as mentioned above, in case of the switching to the power OFF state during the precedent torque phase at the upshift in the power ON state, and the switching to the power ON state during the precedent torque phase at the downshift in the power OFF state, when the power ON/OFF state is switched during the precedent torque phase, the engagement portion on the disengagement side is engaged, and the engagement portion on the engagement side is disengaged so as to perform the changeover shift control at the engagement portion on the engagement side. With this, even when the power ON/OFF state is switched during the precedent torque phase, the unexpected variation of the ratio is not generated in auxiliary transmission mechanism 9, and the variation of the ratio is prevented. Accordingly, in this example, it is possible to prevent the shift shock caused by the switching of the power ON/OFF state during the precedent torque phase.

Moreover, in this example, the present invention is applied to automatic transmission 4 that has continuously variable transmission mechanism 8 and auxiliary transmission mechanism 9 which cooperate the shift control to attain target ratio $Ra_{(total)}$. In this case, even when the power ON/OFF state is switched in a process that the shift control is performed to attain target input rotational speed $N_{i(AT)}(0)$ by the changeover of auxiliary transmission mechanism 9, the unexpected variation of the ratio is not generated in auxiliary transmission mechanism 9. Accordingly, the cooperation of the shift control of the auxiliary transmission mechanism 9 and the shift control of continuously variable transmission mechanism 8 are not disturbed, and it is possible to attain the stable cooperative control.

Moreover, in this example, continuously variable transmission mechanism 8 starts the cooperative control with the shift control of auxiliary transmission mechanism 9 when the power ON/OFF state is switched. Accordingly, the rotational speed control is performed in the engagement portion on the disengagement side in accordance with the input torque to auxiliary transmission mechanism 9 so that the actual input rotational speed $N_{i(AT)}$ of auxiliary transmission mechanism 9 becomes target input rotational speed $N_{i(AT)}(0)$.

On the other hand, the power ON/OFF state can be judged by the accelerator pedal operation (for example, the ON/OFF state of the accelerator opening switch). However, even when the power ON/OFF state is actually switched, the switching of the power ON/OFF state may not be judged when the accelerator pedal operation is small.

On the other hand, the engagement portion such as the clutch and the brake has a function to set the input rotational speed of the engagement portion identical to the output rotational speed of the engagement portion by the engagement. Accordingly, in this example, the switching of the power ON/OFF state is judged by the variation of the rotational speed of auxiliary transmission mechanism 9.

Figure 18A:
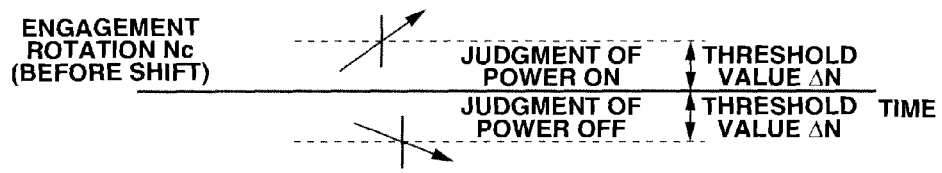
FIG. 18A is an illustrative view showing a method of judging the power ON/OFF state during a no shift state or during a preparation phase.

For example, as shown in FIG. 18A, in the non-shift state in which the changeover shift is not performed, or in preparation phase before shifting to the torque phase or the inertia phase in which the shift judgment is made and the changeover shift is going to be carried out, the engagement rotational speed Nc of the engagement portion (low brake LR/B or high clutch H/C) of auxiliary transmission mechanism 9 is set as a reference. When the automatic transmission input rotational speed Ni increases by a predetermined threshold value ΔN or more with respect to this engagement rotational speed Nc, the power state is judged to be the power ON state. On the other hand, when the automatic transmission input rotational speed Ni decreases by predetermined threshold value ΔN or more with respect to this engagement rotational speed Nc, the power state is judged to be the power OFF state.

Figure 18B:
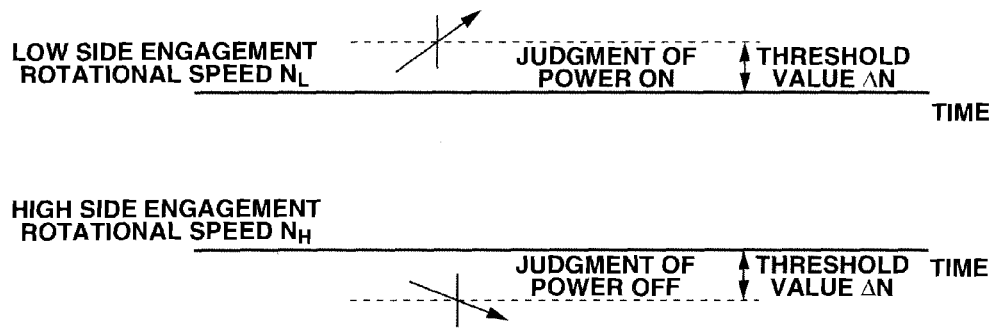
FIG. 18B is an illustrative view showing a method of judging the power ON/OFF state during a torque phase or the inertia phase in the shift.

Moreover, in the shift state after shifting to the torque phase or the inertia phase, engagement rotational speed $Nc_{(low)}$ of the low shift stage (low brake LR/B) of auxiliary transmission mechanism 9 is set as a reference as to the power ON state, as shown in FIG. 18B. When automatic transmission input rotational speed Ni increases by predetermined threshold value ΔN or more with respect to this engagement rotational speed $Nc_{(low)}$, the power state is judged to be the power ON state. On the other hand, engagement rotational speed $Nc_{(Hi)}$ of the high shift stage (high clutch H/C) of auxiliary transmission mechanism 9 is set as a reference as to the power OFF state, as shown in FIG. 18B. When automatic transmission input rotational speed Ni decreases by predetermined threshold value ΔN or more with respect to this engagement rotational speed $Nc_{(Hi)}$, the power state is judged to be the power OFF state. That is, in this example, transmission controller 11 corresponds to the power ON/OFF state judging section.

In this example according to the present invention, the switching of the power ON/OFF state is judged from the variation of the rotational speed of auxiliary transmission mechanism 9. Accordingly, it is possible to surely judge the ON/OFF state of the power even when the torque inputted from the driving source such as the engine to auxiliary transmission mechanism 9 is a small value near zero. Threshold value ΔN can be appropriately varied in accordance with the requirement of the driver, type of vehicle and so on. For example, threshold value ΔN can be set to a small value (for example, 20-50 rotational speed) to surely judge the slip of low brake R/B and high clutch H/C.

Although the embodiment of the present invention has been described above, the invention is not limited to the embodiment described above. Various forms and modifications are included as long as they are not deviated from the gist of the invention. For example, only the auxiliary transmission mechanism 9 may be used as the automatic transmission 4. In this case, the input rotational speed to control the target input rotational speed and so on is the input rotational speed of auxiliary transmission mechanism 9. Auxiliary transmission mechanism 9 may have multiple shift stages including shift stages which are greater than the second speed.

The control apparatus for the automatic transmission includes a stepwise variable transmission mechanism including a plurality of engagement portions having a first engagement portion and a second engagement portion, the stepwise variable transmission mechanism being arranged to attain a target shift stage by combining a disengagement or an engagement of each of the engagement portions; a power ON/OFF state judging section configured to judge a power ON/OFF state; and a shift control section configured to control the stepwise variable transmission mechanism to a target rotational speed by disengaging the first engagement portion and engaging the second engagement portion in accordance with a torque inputted to the stepwise variable transmission mechanism, the shift control section being configured to engage one of the first engagement portion and the second engagement portion which has a function to suppress a variation of an input rotational speed of the stepwise variable transmission mechanism which is generated by a switching of the power ON/OFF state when the power ON/OFF state is switched at the shift control of the stepwise variable transmission mechanism, and to disengage the other of the first engagement portion and the second engagement portion.

Accordingly, even when the power ON/OFF state is switched in a process that the shift control is performed by the changeover between the engagement side and the disengagement side of the stepwise variable transmission mechanism, the unexpected variation of the transmission ratio is not generated, and the variation of the transmission ratio is prevented. Accordingly, it is possible to prevent the shift shock caused by the switching of the power ON/OFF state in the process that the shift control of the rotational speed of the stepwise variable transmission mechanism is performed by the changeover between the engagement side and the disengagement side.

The entire contents of Japanese Patent Application No. 2009-054026 filed Mar. 6, 2009 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A control apparatus for an automatic transmission, the control apparatus comprising:
   a stepwise variable transmission mechanism including a plurality of engagement portions having a first engagement portion and a second engagement portion, the stepwise variable transmission mechanism being arranged to attain a target shift stage by combining a disengagement or an engagement of each of the engagement portions;
   a power ON/OFF state judging section configured to judge a power ON/OFF state; and
   a shift control section configured to control the stepwise variable transmission mechanism to a target rotational speed by disengaging the first engagement portion and engaging the second engagement portion in accordance with a torque inputted to the stepwise variable transmission mechanism, the shift control section being configured to engage one of the first engagement portion and the second engagement portion which has a function to suppress a variation of an input rotational speed of the stepwise variable transmission mechanism which is generated by a switching of the power ON/OFF state when the power ON/OFF state is switched at a shift control of the stepwise variable transmission mechanism, and to disengage the other of the first engagement portion and the second engagement portion, wherein the shift control section is configured to immediately disengage the second engagement portion on an engagement side which was formerly to be engaged during shifting when the power ON/OFF state is switched during an inertia phase at the shift control of the stepwise variable transmission mechanism, and to immediately engage the first engagement portion on a disengagement side which was formerly to be disengaged during shifting to suppress, by the first engagement portion on the disengagement side, the variation of the input rotational speed of the stepwise variable transmission mechanism which is caused by switching of the power ON/OFF state.

2. The control apparatus as defined in claim 1, wherein the shift control section is configured to immediately disengage the second engagement portion on the engagement side formerly to be engaged during shifting when the power ON/OFF state is switched from the power ON state to the power OFF state during the inertia phase at an upshift of the stepwise variable transmission mechanism, or when the power ON/OFF state is switched from the power OFF state to the power ON state during the inertia phase at a downshift of the stepwise variable transmission mechanism, and to immediately engage the first engagement portion on the disengagement side formerly to be disengaged during shifting.

3. The control apparatus as defined in claim 1 wherein the control apparatus further comprises a continuously variable transmission mechanism configured to cooperate with the stepwise variable transmission mechanism, and thereby to attain a target transmission ratio.

4. The control apparatus as defined in claim 1, wherein the power ON/OFF state judging section is configured to judge that the power ON/OFF state is switched, from a variation of a rotational speed of the stepwise variable transmission mechanism.

5. A control apparatus for an automatic transmission, the control apparatus comprising:
a stepwise variable transmission mechanism including a plurality of engagement portions having a first engagement portion and a second engagement portion, the stepwise variable transmission mechanism being arranged to attain a target shift stage by combining a disengagement or an engagement of each of the engagement portions;
a power ON/OFF state judging section configured to judge a power ON/OFF state; and
a shift control section configured to control the stepwise variable transmission mechanism to a target rotational speed by disengaging the first engagement portion and engaging the second engagement portion in accordance with a torque inputted to the stepwise variable transmission mechanism,
the shift control section being configured to immediately engage one of the first engagement portion and the second engagement portion which has a function to suppress a variation of an input rotational speed of the stepwise variable transmission mechanism which is generated by switching of the power ON/OFF state when the power ON/OFF state is switched at a shift control of the stepwise variable transmission mechanism, and to immediately disengage the other of the first engagement portion and the second engagement portion,
wherein the shift control section is configured to disengage the second engagement portion formerly to be engaged during shifting on an engagement side when the power ON/OFF state is switched during a torque phase which is precedent to an inertia phase at the shift control of the stepwise variable transmission mechanism, and to engage the first engagement portion formerly to be disengaged during shifting on a disengagement side to suppress, by the first engagement portion on the disengagement side, a variation of the input rotational speed of the stepwise variable transmission mechanism which is caused by switching of the power ON/OFF state.

6. A control apparatus for an automatic transmission, the control apparatus comprising:
a stepwise variable transmission mechanism including a plurality of engagement portions having a first engagement portion and a second engagement portion, the stepwise variable transmission mechanism being arranged to attain a target shift stage by combining a disengagement or an engagement of each of the engagement portions;
a power ON/OFF state judging section configured to judge a power ON/OFF state; and
a shift control section configured to control the stepwise variable transmission mechanism to a target rotational speed by disengaging the first engagement portion and engaging the second engagement portion in accordance with a torque inputted to the stepwise variable transmission mechanism,
the shift control section being configured to engage one of the first engagement portion and the second engagement portion which has a function to suppress a variation of an input rotational speed of the stepwise variable transmission mechanism which is generated by switching of the power ON/OFF state when the power ON/OFF state is switched at a shift control of the stepwise variable transmission mechanism, and to disengage the other of the first engagement portion and the second engagement portion,
wherein the control apparatus further comprises a continuously variable transmission mechanism configured to cooperate with the stepwise variable transmission mechanism, and thereby to attain a target transmission ratio,
wherein the continuously variable transmission mechanism starts cooperative control with the stepwise variable transmission mechanism when the power ON/OFF state is switched.

7. A control method for an automatic transmission, the automatic transmission including a stepwise variable transmission mechanism including a plurality of engagement portions having a first engagement portion and a second engagement portion, the stepwise variable transmission mechanism being arranged to attain a target shift stage by combining a disengagement or an engagement of each of the engagement portions, the control method comprising:
judging a power ON/OFF state;
controlling the stepwise variable transmission mechanism to a target rotational speed by disengaging the first engagement portion and engaging the second engagement portion in accordance with a torque inputted to the stepwise variable transmission mechanism;

engaging one of the first engagement portion and the second engagement portion which has a function to suppress a variation of an input rotational speed of the stepwise variable transmission mechanism which is generated by switching of the power ON/OFF state when the power ON/OFF state is switched at shift control of the stepwise variable transmission mechanism; and disengaging the other of the first engagement portion and the second engagement portion;

wherein immediate disengagement of the second engagement portion occurs on an engagement side formerly to be engaged during shifting when the power ON/OFF state is switched during an inertia phase at the shift control of the stepwise variable transmission mechanism; and wherein immediate engagement of the first engagement portion occurs on a disengagement side formerly to be disengaged during shifting to suppress, by the first engagement portion on the disengagement side, the variation of the input rotational speed of the stepwise variable transmission mechanism which is caused by switching of the power ON/OFF state.

* * * * *